(12) United States Patent
Taylor et al.

(10) Patent No.: US 11,445,697 B2
(45) Date of Patent: Sep. 20, 2022

(54) PET BED

(71) Applicant: Chagrinovations, LLC, Naples, FL (US)

(72) Inventors: Curtis Taylor, Chagrin Falls, OH (US); Aaron Misener, Chagrin Falls, OH (US)

(73) Assignee: CHAGRINOVATIONS, LLC, Naples, FL (US)

( * ) Notice: Subject to any disclaimer, the term of this patent is extended or adjusted under 35 U.S.C. 154(b) by 97 days.

(21) Appl. No.: 16/708,629

(22) Filed: Dec. 10, 2019

(65) Prior Publication Data
US 2020/0196564 A1    Jun. 25, 2020

Related U.S. Application Data

(60) Provisional application No. 62/783,621, filed on Dec. 21, 2018, provisional application No. 62/913,390, filed on Oct. 10, 2019.

(51) Int. Cl.
*A01K 1/035*    (2006.01)

(52) U.S. Cl.
CPC .................. *A01K 1/0353* (2013.01)

(58) Field of Classification Search
CPC .... A01K 1/0353; A01K 1/0157; A01K 1/015; A01K 1/035; A47G 2009/003
See application file for complete search history.

(56) References Cited

U.S. PATENT DOCUMENTS

| | | | | |
|---|---|---|---|---|
| 2,032,248 A | * | 2/1936 | Bins ..................... | A01K 1/0353 119/482 |
| 5,662,065 A | * | 9/1997 | Bandimere .......... | A01K 1/0353 119/28.5 |
| 5,765,502 A | * | 6/1998 | Haugh ................ | A01K 1/0353 119/28.5 |
| 6,966,275 B2 | * | 11/2005 | Whitehill ............. | A01K 1/0353 119/28.5 |
| 2003/0066489 A1 | * | 4/2003 | Whitehill ............. | A01K 1/0353 119/28.5 |
| 2005/0087142 A1 | * | 4/2005 | Dalal ................... | A01K 1/0353 119/28.5 |
| 2006/0288943 A1 | * | 12/2006 | Ku ....................... | A01K 1/0353 119/28.5 |
| 2008/0295775 A1 | * | 12/2008 | Arvanites ............ | A01K 1/0353 119/28.5 |
| 2012/0291711 A1 | * | 11/2012 | Baker .................. | A01K 1/0353 119/28.5 |

* cited by examiner

*Primary Examiner* — Trinh T Nguyen
(74) *Attorney, Agent, or Firm* — Ulmer & Berne LLP; Brian E Turung

(57) ABSTRACT

A pet bed for supporting an animal. The pet bed has a flexible cushion substrate and/or a peripheral support, and optionally a cover pad adapted to conform to a top surface of the flexible cushion substrate and/or peripheral support.

17 Claims, 18 Drawing Sheets

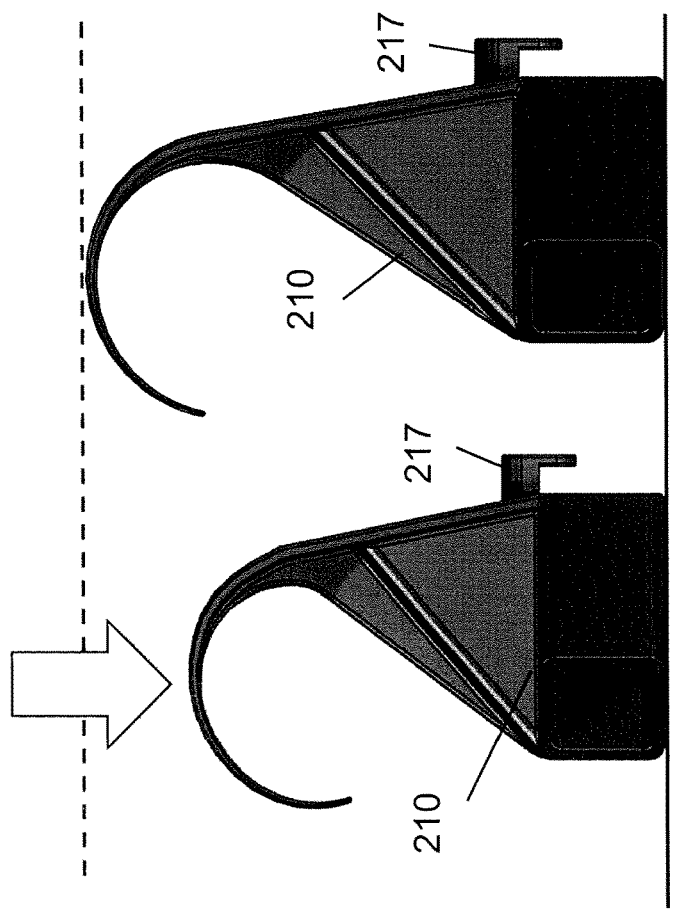
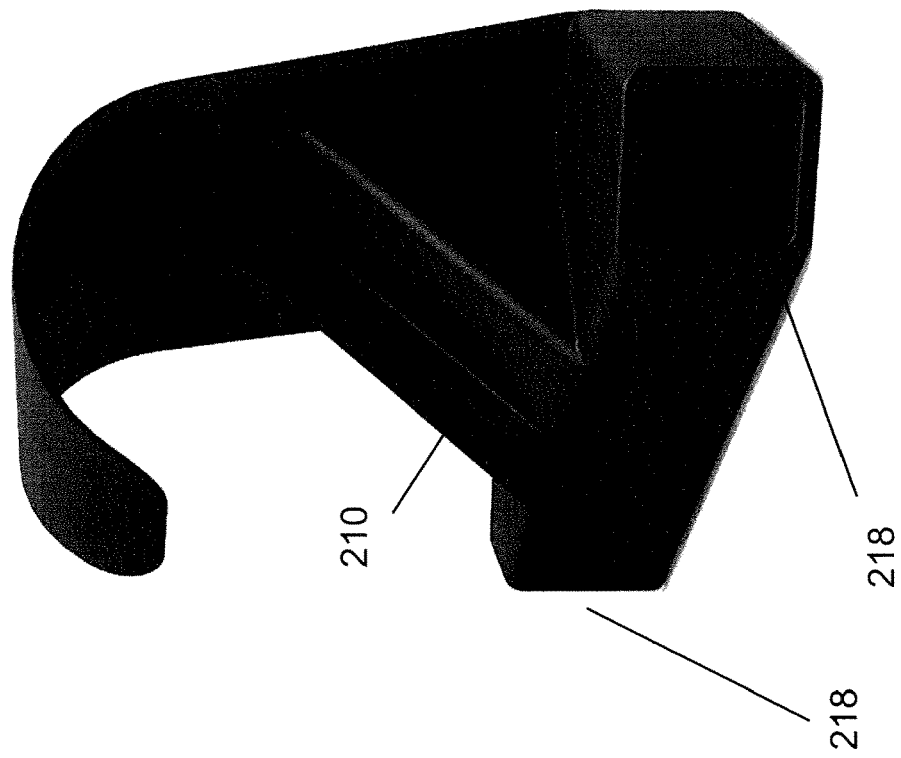
FIG. 7

PET BED

The present disclosure claims priority on U.S. Provisional Application Ser. No. 62/783,621 filed Dec. 21, 2018 and 62/913,390 filed Oct. 10, 2019, which are both incorporated herein by reference.

The present exemplary embodiments relate to bed products for animals. It finds particular application in conjunction with sanitary pet beds and will be described with particular reference thereto. However, it is to be appreciated that the present exemplary embodiment is also amenable to other like applications.

BACKGROUND

Current pet and animal beds are often large, heavy, and bulky. Many pet beds are constructed of fabric-like materials and foams that readily absorb and retain undesirable odors and germs. For example, a typical pet bed includes a fabric casing filled with a filler/support material including fiber filling, foam filling, and polyester. The fabric casing as well as the filler material absorb pet odors, fluids, dirt, and other unwanted particles and organisms. Given the large size and often low-quality construction, cleaning the pet bed can result in damage to the pet bed and is a burdensome chore, if even possible. Thus, it is not unusual for a pet owner to treat the pet bed as a disposable product after a long period of pet use and purchase a replacement bed when the current bed becomes worn or rancid.

Some animals, upon receiving a bed filled with stuffing or foam, tend to deconstruct the bed (i.e., rid the bed casing of its internal materials) much to the dismay of the owner. In the worst cases, pet beds are constructed of toxic materials. These materials may emit fumes or, if ingested, can have an adverse effect on the animal's health.

Many pet beds are large, bulky items that are not convenient to transport or store. As such, these pet beds are typically left behind during trips or are disposed of during a move to a new location.

Thus, it is desirable to provide a pet bed that is lightweight, easy to clean, portable, and overcomes the deficiencies of the prior art bet beds.

BRIEF DESCRIPTION

Various details of the present disclosure are hereinafter summarized to provide a basic understanding. This summary is not an extensive overview of the disclosure and is neither intended to identify certain elements of the disclosure nor to delineate scope thereof. Rather, the primary purpose of this summary is to present some concepts of the disclosure in a simplified form prior to the more detailed description that is presented hereinafter.

The present disclosure provides a pet bed for supporting an animal optionally without the use of foam or filler material. In particular, the present disclosure provides a pet bed having a flexible cushion substrate and a removable pad adapted to conform to a top surface of a top portion of the flexible cushion substrate.

Non-limiting features of the pet bed include one or more of the following:
non-foam filled;
non-toxic materials;
anti-microbial materials;
safer for the pet;
easy to clean;
unit ships in a small box;
easy to assemble;
no tools required for assembly;
suspended TPE material provides cushion to pet bed;
flexible corner supports for added cushion to pet bed;
can be used indoor or outdoor;
one or more inflatable components;
convenient to transport and store; and
one or more drain holes in center of pet bed to prevent liquid collecting in pet bed.

In one non-limiting aspect of the present disclosure, there is provided a pet bed that includes a flexible cushion substrate. The flexible cushion substrate generally includes a top portion and a sidewall that is connected to and around the perimeter of the top portion and defining a body of the flexible cushion substrate. The top surface of the top portion can be flat, concave, etc., to provide a comfortable shape on the pet bed upon which an animal can lie. The flexible cushion substrate is generally partially or fully made of a flexible material that allows the surface to flex, stretch, and/or bend under the weight of an animal, such as a dog, cat, etc., on the pet bed. The flexible cushion substrate is configured to provide a similar comfort/give that a pet may experience when lying on a foam or fiber-filled bed; however, this is not required. In one non-limiting embodiment, the flexible cushion substrate is partially or fully formed of an elastomer material (e.g., rubber, polymeric foam, etc.). In another non-limiting embodiment, the flexible cushion substrate is partially or fully formed of a flexible thermoplastic elastomer (TPE). In another non-limiting embodiment, the flexible cushion substrate can be molded into a desired bed shape; however, this is not required.

In another and/or alternative non-limiting aspect of the disclosure, the flexible cushion substrate can optionally be partially or fully formed of an antimicrobial material. For instance, the flexible cushion substrate can optionally include antimicrobial nanoparticles that are substantially uniformly dispersed in a polymer matrix and, even more particularly, the antimicrobial devices include metal antimicrobial nanoparticles substantially uniformly dispersed in a polymer matrix. As defined herein, "antimicrobial device having substantially uniformly dispersed antimicrobial nanoparticles in a polymer matrix" means that for a certain volume of the polymer device (e.g., 150-1000 cubic microns and all values and ranges therebetween) that includes the antimicrobial nanoparticles in different locations, such certain volumes will have within 60-100% (and all values and ranges therebetween) of the same weight percent of antimicrobial nanoparticles and 50-100% (and all values and ranges therebetween) of the antimicrobial nanoparticles in such certain volume will be spaced apart from one another. Non-limiting antimicrobial nanoparticles include one or more metal materials selected from the group of zinc metal, copper metal, silver metal, iron metal, zinc oxide, copper oxide, silver oxide, iron oxide, and/or salts of zinc, copper, silver, and/or iron. In one particular non-limiting embodiment, the antimicrobial nanoparticles include or are fully formed of zinc metal, salts of zinc, and/or zinc oxide. In another particular non-limiting embodiment, the antimicrobial nanoparticles include or are fully formed of zinc metal and/or zinc oxide. In another particular non-limiting embodiment, the antimicrobial nanoparticles include or are fully formed of zinc metal. When the antimicrobial nanoparticles include or are fully formed of metal, the purity of the metal is at least about 90%, typically have a purity of at least about 98%, more typically have a purity of at least about 99%, and even more have a purity of at least about 99.95%. Generally, the metal used as the antimicrobial nanoparticle is a single metal; however, it can be a metal alloy that includes two or more of zinc metal, copper metal, silver metal, and/or iron metal (e.g., Zn—Cu alloy, Zn—Ag alloy, Ag—Cu alloy, Fe—Ag alloy, Fe—Zn alloy, etc.).

In another and/or alternative non-limiting aspect of the disclosure, the top surface of the top portion of the flexible cushion substrate can optionally is concave shaped and optionally include a plurality one or more perforations. The one or more perforations (when used) allow moisture such as water, pet urine, and the like to drain through the flexible cushion substrate, thus limiting the amount of trapped liquid on the top surface of the flexible cushion substrate. If the pet bed is used as an outdoor product, the plurality of perforations can provides a drain preventing rainwater and other moisture from collecting in the pet bed. Generally, the central region of the flexible cushion substrate is positioned lower than the regions about the central region such that liquid that is deposited on the top surface of the central region flows via gravity to the central region and then through the one or more optional perforations that are located in the central region.

In another and/or alternative non-limiting aspect of the disclosure, the pet bed optionally includes a cover pad. The cover pad can be used to provide a comfort layer on the pet bed for the pet. The cover pad (when used) is configured to conform to the top surface of the top portion of the flexible cushion substrate. The cover pad can be configured to conform to and/or have the same or similar shape as the top surface of the top portion of the flexible cushion substrate. The cover pad is optionally removably attached to flexible cushion substrate. In such an arrangement, the cover pad can be attached to the flexible cushion substrate by a fastener (e.g., snap fastener, hook and loop fastener, zipper, tongue and groove connection, mushroom-shaped stem connector, button fasteners, etc.). The flexible cushion substrate can optionally include a corresponding fastener receiver adapted to receive and secure fastener to a fastener or portion of a fastener on the cover pad. In this way, the cover pad can be easily removed from the flexible cushion substrate so that the cover pad and/or the flexible cushion substrate can be washed or otherwise cleaned.

In another and/or alternative non-limiting aspect of the disclosure, the bottom surface of the cover pad can optionally include a friction-enhanced surface such as, for example and without limitation, a rubber surface. The friction-enhanced surface can be used to minimize sliding of the cover pad with respect to the flexible cushion substrate; thus, when a pet climbs onto the pet bed, the cover pad stays in position on the top surface of the top portion of the flexible cushion substrate.

In another and/or alternative non-limiting aspect of the disclosure, the pet bed optionally includes a cover pad that includes a bolster. The bolster (when used) is configured to extend around a portion or all of the upper perimeter portion of the cover pad. In one non-limiting embodiment, the bolster fully encircles the upper perimeter portion of the cover pad. In another non-limiting embodiment, the bolster encircles 55-80% of the upper perimeter portion of the cover pad. When the bolster only covers a portion of the upper perimeter portion of the cover pad, a bolster gap is formed by the bolster that defines an area where no bolster is present on the upper perimeter portion of the cover pad. The bolster gap (when present) allows an animal to easily climb onto and/or exit from the top of the cover pad while the cover pad is positioned on the top surface of the top portion of the flexible cushion substrate.

In another and/or alternative non-limiting aspect of the disclosure, the bolster (when used) may be permanently or removably attached to the cover pad. When the bolster is removably attach to the cover pad, such connection can be a snap fastener, hook and loop fastener, zipper, tongue and groove connection, mushroom-shaped stem connector, button fastener, and the like. In this way, the bolster can be easily removed from the cover pad so that the cover pad and/or bolster can be washed or otherwise cleaned.

In another and/or alternative non-limiting aspect of the disclosure, the cover pad and/or bolster can include a fabric material such as, for example and without limitation, polyester vinyl, etc. In one non-limiting embodiments, the fabric material of the cover pad and/or the bolster can be optionally impregnated with materials and/or compounds that are configured to eliminate and/or reduce odor and/or deter and/or kill germs. In some non-limiting embodiments, the materials and/or compounds for eliminating odor include zinc, silver, and/or other micro- and nanoparticles.

In another and/or alternative non-limiting aspect of the disclosure, the pet bed optionally includes at least one peripheral support. The at least one peripheral support is configured to engage and suspend the flexible cushion substrate above a floor surface. The peripheral supports provide a mechanism for suspending the flexible cushion substrate above the ground such that the sidewall of the flexible cushion substrate is positioned above a floor surface when the pet bed is placed on the floor. The peripheral supports can also optionally provide additional flexing and cushion to an animal while the animal is positioned on the pet bed. When an animal climbs on the pet bed, the peripheral supports experience a downward force and can be configured to flex to a second compressed state in response to the downward force; however, this is not required.

In another and/or alternative non-limiting aspect of the disclosure, the at least one peripheral support can optionally be configured to engage at least one lower or bottom corner or bottom portion of the flexible cushion substrate. As can be appreciated, the peripheral support can be located at select locations on the bottom portion of the flexible cushion substrate or be positioned about the complete locate perimeter of the bottom of the flexible cushion substrate.

In another and/or alternative non-limiting aspect of the disclosure, the peripheral support (when used) can include a base, a cantilever portion, and a support wall connecting the base to the cantilever portion. The cantilever portion can be resilient such that the cantilever portion can flex from a first position to a second downward compressed position in response to a downward force (e.g., a downward force from an animal climbing onto the pet bed). When a downward force is no longer present (e.g., pet exits the pet bed), the cantilever portion can be designed to return to the first position.

In another and/or alternative non-limiting aspect of the disclosure, the peripheral support (when used) can include at least one channel for receiving a frame member. The frame member can be configured to engage the channel of the peripheral support to define a base to support and suspend the flexible cushion substrate. The frame members can optionally be formed of a rigid material to provide structure and support to the pet bed.

In another and/or alternative non-limiting aspect of the disclosure, the pet bed includes a flexible cushion substrate having a top portion and a sidewall. The sidewall can optionally include a plurality of sidewall apertures that are optionally configured to engage with a locking tab located on the outwardly facing support wall of a peripheral support.

When the locking tab is engaged with the sidewall aperture, the flexible cushion substrate can be configured to be secured to the frame system.

In another and/or alternative non-limiting aspect of the disclosure, the cover pad can be configured to overlap a portion of the flexible cushion substrate that corresponds to a region wherein the bolster is absent from the top edge of the flexible cushion substrate.

In another and/or alternative non-limiting aspect of the disclosure, the pet bed includes a peripheral support configured to engage and suspend the flexible cushion substrate. The shape of the peripheral support is non-limiting (e.g., donut shaped, square-shaped, oval-shaped, rectangular-shaped, polygonal-shaped, etc.). The peripheral support can optionally be partially or fully formed of an inflatable tube; however, the peripheral support can be formed of other material (e.g., foam, polyurethane, plastic, rubber, etc.). The inflatable tube can have one or more air chambers. In such a non-limiting configuration, the user can inflate the inflatable tube peripheral support with air or other type of gas to obtain the shaped structure for supporting and suspending the flexible cushion substrate. In another non-limiting embodiment, the peripheral support has a generally flat bottom portion that is configured to engage a floor surface. In another non-limiting embodiment, the peripheral support has a generally curved upper surface that is configured to engage a cavity in the bottom surface of the flexible cushion substrate.

In another and/or alternative non-limiting aspect of the disclosure, the peripheral support is a single piece of flexible material such as plastic or rubber.

In another and/or alternative non-limiting aspect of the disclosure, the peripheral support is assembled from a plurality pieces (e.g., arc-like pieces, straight pieces, etc.).

In another and/or alternative non-limiting aspect of the disclosure, the peripheral support provides a framing function and an overall structure to the pet bed.

In another and/or alternative non-limiting aspect of the disclosure, the peripheral support can optionally include one or more locking tabs that are configured to engage sidewall apertures of the flexible cushion substrate. The locking tabs can be used to secure the flexible cushion substrate to the peripheral support via the one or more tab openings in the flexible cushion substrate. Generally, the one or more tab openings are located on the side of the flexible cushion substrate; however, this is not required. In this way, the pet bed may be lifted and moved to a different location while minimizing the possibility that the pet bed may become dissembled during transport.

In another and/or alternative non-limiting aspect of the disclosure, the pet bed includes an inflatable peripheral support (e.g., inflatable tube). The shape of the inflatable peripheral support is non-limiting (e.g., donut-shaped, etc.). The outer peripheral cross-sectional shape of peripheral support along its longitudinal axis is non-limiting (e.g., circular, square, oval, polygonal, etc.). The cross-sectional shape of the peripheral support is non-limiting (e.g., circular, C-shaped, square, oval, polygonal, etc.). In one configuration, the bottom surface of the peripheral support is flat so as to provide improved surface contact with a floor to inhibit movement of the pet bet on a floor. The material used to form the inflatable portion of the peripheral support is non-limiting (e.g., flexible rubber material, flexible synthetic rubber material, vinyl, etc.).

In another and/or alternative non-limiting aspect of the disclosure, the inflatable portion of the inflatable peripheral support is partially or fully covered or encapsulated by a material that is used to a) provide protection to the inflatable portion, b) provide structural strength to the inflatable portion, and/or c) to minimize deformation or damage to the inflatable portion. When a large pet lays on the pet bed, the weight of the pet will cause the inflatable portion of the inflatable peripheral support to compress. Excessive weight on the inflatable portion can result in excessive compression and deformation of the inflatable portion, which can result in damage or bursting of the inflatable portion. The material that is used to partially or fully encapsulate the inflatable portion is configured to reduce the amount of compression of the inflatable portion and to inhibit or prevent damage or bursting of the inflatable portion when heavy pet is positioned on the pet bed. Generally, the material encapsulates at least 50% of the outer surface of the inflatable portion and typically encapsulates 55-100% (and all values and ranges therebetween) of the outer surface of the inflatable portion. In one non-limiting configuration, the material encapsulates 90-100% of the outer surface of the inflatable portion. The material can be fitted about the inflatable portion and/or connected to the inflatable portion (e.g., adhesive connection, melted bond, stitching, snaps, buttons, zipper, hook and loop connection, mushroom stem connection, etc.). The material can be a fabric material (polyester material, rayon, nylon, spandex, etc.), fiber-reinforced fabric material, vinyl, etc. In one non-limiting embodiment, the material is a polyester material such as, but not limited to, a polyester micro-suede material. The material is generally a flexible material that can at least partially conform to the shape of the inflatable portion when the inflatable portion is compressed and decompressed. If the material is connected to the inflatable portion, the material can be stretchable to at least partially conform to the shape of the inflatable portion when inflated, deflated, compressed, and decompressed.

In another and/or alternative non-limiting aspect of the disclosure, the inflatable peripheral support includes a central opening that fully passes through the top and bottom of the inflatable peripheral support. The central opening constitutes at least 5% of the cross-sectional area of the inflatable peripheral support, typically about 10-90% (and all values and ranges therebetween) of the of the cross-sectional area of the inflatable peripheral support, and more typically about 20-70% of the of the cross-sectional area of the inflatable peripheral support. When the inflatable peripheral support has a circular cross-sectional shape and the central opening has a circular cross-sectional shape, the diameter of the central opening is at least 15% the diameter of the inflatable peripheral support, and typically about 20-90% the diameter (and all values and ranges therebetween) of the inflatable peripheral support. The central opening can be used to allow liquid that has passed through a top portion of the pet bed. When the pet bed is located on a floor surface, the cavity in the inflatable peripheral support that is formed by the central opening can optionally be used to partially or fully trap liquids that have passed through the top portion of the pet bed; however, this is not required. Such a feature of the pet bed can be used to reduce mess about the pet bed. When the inflatable peripheral support has a flat bottom surface, such a surface configuration can facilitate in trapping liquids such that liquids in the cavity are inhibited or prevented from passing between the floor surface and the flat bottom surface of the inflatable peripheral support when the inflatable peripheral support is positioned on the floor surface.

In another and/or alternative non-limiting aspect of the disclosure, the inflatable peripheral support can optionally include a support material that is connected to one or both sides of the inflatable peripheral support and partially or fully covers the central opening in the inflatable peripheral support. The support material can be formed of the same or different material from the inflatable peripheral support. In one non-limiting embodiment, the support material is generally formed of a flexible material. The support material can optionally be formed of a stretchable material that can optionally be used to create a trampoline-type effect when a pet rests on the support material. The type of connection between the support material and inflatable peripheral support is non-limiting (e.g., stitching, adhesive, melted seam, hook and loop fastener, zipper, snaps, clips, cord and loops, hooks, etc.). In one non-limiting embodiment, the support material is connected to the inflatable peripheral support by stitching, adhesive, and/or a melted seam. In another non-limiting embodiment, the support material overlies at least 50% of the cross-sectional area of the central opening in the inflatable peripheral support and typically overlies 60-100 (and all values and ranges therebetween) of the central opening in the inflatable peripheral support. The support material is generally connected to the top peripheral edge of the central opening in the inflatable peripheral support; however, this is not required. In such an arrangement, the support material is located above a floor surface when the pet bed is positioned on the floor surface. When the inflatable peripheral support is fully inflated, the spacing of the support material from a floor surface is such that the support material does not contact the floor surface when the bottom surface of the bet bed is positioned on the floor surface and a pet is on the pet bed. As such, even when the support material is flexible and/or stretchable, the support material does not contact the floor surface when a pet is on the pet bed while the bottom surface of the pet bed is positioned on the floor surface.

In another and/or alternative non-limiting aspect of the disclosure, support material can optionally be configured such that when it is connected on the inflatable peripheral support, the central region of the support material is positioned below the peripheral edges of the support material to thereby form a recessed portion in the support material. Such recessed portion can be configured to cause liquids that fall upon the top surface of the top portion of the support material to flow toward the recessed portion to thereby collect liquids in the recessed portion. The support material can optionally include one or more slots or openings in the recessed portion to enable liquid to pass through the support material and into the central opening of the inflatable peripheral support; however, this is not required. In one non-limiting configuration, the support material includes an opening (e.g., circular opening, etc.) in the central region of the support material. The size of the opening in the support material generally has a cross-sectional area of no more than 12 square inches and typically about 0.03-5 square inches. The one or more openings in the support material can optionally be formed from of a tubular material (e.g., plastic or metal tube) that is connected to the support material (e.g., stitching, adhesive, melted seam, etc.). The support material can be formed of a material that inhibits or prevents liquids from flowing through the support material; however, this is not required. As can be appreciate, the support material could be formed of a mesh material or other type of material that allows liquids to flow through the support material. The support material can be formed of a single piece of material or a plurality of pieces that have been connected together.

In another and/or alternative non-limiting aspect of the disclosure, the pet bed can optionally include a bolster that is connected to the inflatable peripheral support. The bolster can optionally be inflatable and/or can be filled with a foam material or other type of compressible material; however, this is not required. The bolster is connected to a top portion of the inflatable peripheral support. The type of connection between the bolster and the inflatable peripheral support is non-limiting (e.g., stitching, adhesive, melted seam, hook and loop fastener, zipper, snaps, clips, cord and loops, hooks, buttons, mushroom stem fastener, etc.). When the bolster is inflatable, the bolster can be configured to inflated simultaneously with the inflatable peripheral support due to one or more air passages formed between the internal air chambers of the bolster and the inflatable peripheral support. Alternatively, the bolster can be a separate component that requires the bolster to be independently inflated from the inflatable peripheral support. The bolster can be configured to be removably connected to the inflatable peripheral support so as to facilitate in the cleaning of the pet bed; however, this is not required. In one non-limiting arrangement, the bolster is removably connected to the inflatable peripheral support by a zipper, hook and loop fastener, or a mushroom stem connection arrangement. The zipper (when used) can be partially located on the inner bottom edge of the bolster. Generally, the zipper (when used) extends 70-100% (and all values and ranges therebetween) of the inner bottom edge of the bolster. When the bolster includes front ends, the zipper can optionally be positioned on the bottom edge of the bolster front ends. The height or thickness of the bolster is generally less than the height or thickness of the inflatable peripheral support. Generally, the height or thickness of the bolster is generally less than 30-80% the height or thickness (and all values and ranges therebetween) of the inflatable peripheral support. The cross-sectional shape of the bolster is non-limiting (e.g., circular, oval, square, rectangular, polygonal, etc.). The bolster can be configured to partially or fully encircle the top peripheral edge of the inflatable peripheral support. In one non-limiting embodiment, the bolster only encircles 50-90% (and all values and ranges therebetween) of the top peripheral edge of the inflatable peripheral support, and typically 55-75% of the top peripheral edge of the inflatable peripheral support. The bolster, when connected to the inflatable peripheral support, is sized and configured to cover no more than 50% of the top surface of the top portion of the inflatable peripheral support, typically about 5-45% (and all values and ranges therebetween) of the top surface of the top portion of the inflatable peripheral support, and more typically, about 5-35% of the top surface of the top portion of the inflatable peripheral support. When the bolster does not fully encircle the top surface of the top portion of the inflatable peripheral support, the two ends of the bolster can optionally have a downward sloped surface that can provide added comfort to the pet when the pet's head lies against one of the ends of the bolster. When the bolster is connected to the inflatable peripheral support, the side surface of the bolster is generally flush with the outer side surface of the inflatable peripheral support and generally does not extend more than one inch beyond the outer side surface of the inflatable peripheral support, nor is the bolster recessed inwardly more than one inch from the outer side surface of the inflatable peripheral support.

In another and/or alternative non-limiting aspect of the disclosure, the pet bed can optionally include a cover pad that is configured to partially or fully overlie the inflatable peripheral support and optional bolster. The cover pad can be formed of any number of materials (e.g., fabric, plastic, vinyl, foam, etc.). The type of connection used to secure the cover pad to the inflatable peripheral support and optional bolster is non-limiting (e.g., form fit, stitching, adhesive, melted seam, hook and loop fastener, zipper, snaps, clips, cord and loops, hooks, etc.). In one non-limiting arrangement, the cover pad is configured to be form fitted about the inflatable peripheral support and optional bolster. Generally, the cover pad fully covers the bolster (when used) when the cover pad is positioned in the inflatable peripheral support. Generally, the cover pad fully covers the exposed top surface of the top portion of the inflatable peripheral support when the cover pad is positioned in the inflatable peripheral support. Generally, the cover pad partially or fully covers the exposed sides of the inflatable peripheral support when the cover pad is positioned in the inflatable peripheral support. In one non-limiting configuration, the cover pad fully covers the exposed sides of the inflatable peripheral support when the cover pad is positioned in the inflatable peripheral support. Generally, the cover pad partially or fully covers the bottom surface of the inflatable peripheral support when the cover pad is positioned in the inflatable peripheral support. In one non-limiting configuration, the cover pad only partially covers (5-75% and all values and ranges therebetween) the bottom surface of the inflatable peripheral support when the cover pad is positioned in the inflatable peripheral support. The cover pad is generally formed of a flexible material (e.g., nylon, rayon, polyester, cotton, linen, spandex, etc.). The cover pad can optionally be formed of a stretchable material to facilitate in the insertion and the removal from the inflatable peripheral support to facilitate in the assembly/disassembly of the pet bed and the cleaning of the pet bed. In one non-limiting arrangement, the cover pad is formed of a porous material to allow liquids to pass through the cover pad so that the liquids can flow to the inflatable peripheral support and through the support material.

In another and/or alternative non-limiting aspect of the disclosure, the materials used to form the cover pad, support material, bolster, and/or the inflatable peripheral support can optionally include elements for eliminating odor and/or prevent or inhibit microorganism growth (e.g., zinc, silver, and/or other micro- and nanoparticles).

In one non-limiting object of the present disclosure, there is the provision of an improved pet bed.

In another and/or alternative non-limiting object of the present disclosure, there is the provision of a pet bed having a flexible cushion substrate and/or a peripheral support, and an optionally removable cover pad.

In another and/or alternative non-limiting object of the present disclosure, there is the provision of a pet bed that 1) is non-foam filled, 2) is formed of non-toxic materials for pets, 3) includes antimicrobial materials, 4) is safer for pets, 5) is easy to clean, 6) can be shipped in a small box, 7) is easy to assemble, 8) requires no tools for assembly, 9) provides cushioning to a pet on the pet bed, 10) includes flexible corner supports for added cushion for the pet bed, 11) can be used indoor or outdoor, 11) includes one or more inflatable components, 12) is convenient to transport and store, and/or 13) includes one or more drain holes to prevent liquid collecting in the pet bed.

In another and/or alternative non-limiting object of the present disclosure, there is the provision of a pet bed that includes a flexible cushion substrate, wherein the flexible cushion substrate can include a top portion and a sidewall that is connected to and around the perimeter of the top portion.

In another and/or alternative non-limiting object of the present disclosure, there is the provision of a pet bed that is partially or fully formed of an antimicrobial material.

In another and/or alternative non-limiting object of the present disclosure, there is the provision of a pet bed wherein the top surface of the top portion of the flexible cushion substrate can optionally be concave shaped and optionally include a plurality of openings or perforations.

In another and/or alternative non-limiting object of the present disclosure, there is the provision of a pet bed that optionally includes a cover pad.

In another and/or alternative non-limiting object of the present disclosure, there is the provision of a pet bed that optionally includes a cover pad and a bolster on the cover pad.

In another and/or alternative non-limiting object of the present disclosure, there is the provision of a pet bed wherein the bolster is permanently or removably attached to the cover pad.

In another and/or alternative non-limiting object of the present disclosure, there is the provision of a pet bed that optionally includes at least one peripheral support that is configured to engage and suspend the flexible cushion substrate above a floor surface.

In another and/or alternative non-limiting object of the present disclosure, there is the provision of a pet bed wherein the at least one peripheral support can optionally be configured to engage at least one lower or bottom corner or bottom portion of the flexible cushion substrate.

In another and/or alternative non-limiting object of the present disclosure, there is the provision of a pet bed wherein the peripheral support includes a base, a cantilever portion, and a support wall connecting the base to the cantilever portion, wherein the cantilever portion can flex from a first position to a second downward compressed position in response to a downward force.

In another and/or alternative non-limiting object of the present disclosure, there is the provision of a pet bed wherein the peripheral support can include at least one channel for receiving a frame member.

In another and/or alternative non-limiting object of the present disclosure, there is the provision of a pet bed wherein the peripheral support can be optionally partially or fully formed of an inflatable tube.

In another and/or alternative non-limiting object of the present disclosure, there is the provision of a pet bed comprising a flexible cushion substrate and a peripheral support connected to a bottom of the flexible cushion substrate. The flexible cushion substrate has a top portion and a sidewall that is connected to and around the perimeter of the top portion. A top surface of the top portion has a concave profile wherein a center portion is positioned below a top perimeter of the top surface. The center portion includes an opening that fully passes through the flexible cushion substrate to function as a drain for liquid in the center portion of the top surface of the top portion. The flexible cushion substrate is optionally a molded component. At least 50% of the flexible cushion substrate is optionally formed of a polymer material. The peripheral support is configured to engage and suspend the flexible cushion substrate above a floor surface when the pet bed is positioned on a floor surface. The peripheral support is optionally configured to provide additional flexing and cushion to an animal on the pet bed. The peripheral support is optionally configured to compress to a second compressed state when a downward force is applied to the flexible cushion substrate. The peripheral support is optionally configured to decompress to its original uncompressed state when the downward force is removed from the flexible cushion substrate. The flexible cushion substrate is optionally positioned above the floor surface while the peripheral support is in the second compressed state.

In another and/or alternative non-limiting object of the present disclosure, there is the provision of a pet bed wherein the peripheral support is located at a bottom corner of the flexible cushion substrate. At least a portion of the peripheral support is optionally wedged into a bottom portion of the flexible cushion substrate to create a friction engagement between the peripheral support and the flexible cushion substrate.

In another and/or alternative non-limiting object of the present disclosure, there is the provision of a pet bed wherein the peripheral support optionally includes a base, a cantilever portion, and a support wall connecting the base to the cantilever portion. The cantilever portion is resilient such that the cantilever portion can optionally flex from a first position to a second downward compressed position in response to the downward force being applied to the flexible cushion substrate. The cantilever portion is optionally configured to flex to the first position when the downward force is no longer applied to the flexible cushion substrate.

In another and/or alternative non-limiting object of the present disclosure, there is the provision of a pet bed wherein the peripheral support optionally includes a first channel. The first channel is optionally configured to allow a first end of a frame member to be connected to the peripheral support, and wherein a second end of the frame member is optionally connected to another peripheral support.

In another and/or alternative non-limiting object of the present disclosure, there is the provision of a pet bed wherein the peripheral support optionally includes first and second channels. The first channel is optionally configured to allow a first end of a first frame member to be connected to the peripheral support. A second end of the first frame member is optionally connected to a second peripheral support. The second channel is optionally configured to allow a first end of a second frame member to be connected to the peripheral support. A second end of the second frame member is optionally connected to a third peripheral support.

In another and/or alternative non-limiting object of the present disclosure, there is the provision of a pet bed wherein the frame member optionally radially extends between a center position of the flexible cushion substrate and a corner of the flexible cushion substrate.

In another and/or alternative non-limiting object of the present disclosure, there is the provision of a pet bed wherein the flexible cushion substrate is optionally at least partially formed of an antimicrobial material.

In another and/or alternative non-limiting object of the present disclosure, there is the provision of a pet bed wherein the cantilever portion of the peripheral support is optionally connected via a fastener to the top portion of the flexible cushion substrate.

In another and/or alternative non-limiting object of the present disclosure, there is the provision of a pet bed wherein the base of the peripheral support is optionally releasably connected by a connector to an aperture in the sidewall of the flexible cushion substrate.

In another and/or alternative non-limiting object of the present disclosure, there is the provision of a pet bed that optionally includes a cover pad.

In another and/or alternative non-limiting object of the present disclosure, there is the provision of a pet bed that includes a cover pad that is optionally configured to provide a comfort layer on the pet bed for a pet.

In another and/or alternative non-limiting object of the present disclosure, there is the provision of a pet bed that includes a cover pad that is optionally removably connected to the flexible cushion substrate.

In another and/or alternative non-limiting object of the present disclosure, there is the provision of a pet bed wherein the cover pad optionally has a concave shape that matches or is similar to a concave shape of the top surface of the top portion of the flexible cushion substrate.

In another and/or alternative non-limiting object of the present disclosure, there is the provision of a pet bed that optionally includes a bolster that is configured to extend around a portion of an outer perimeter of the cover pad.

In another and/or alternative non-limiting object of the present disclosure, there is the provision of a pet bed wherein the bolster is optionally releasably connected to said cover pad.

In another and/or alternative non-limiting object of the present disclosure, there is the provision of a pet bed wherein the bolster is optionally releasably connected to the cover pad via a zipper.

In another and/or alternative non-limiting object of the present disclosure, there is the provision of a pet bed wherein the peripheral support is optionally an inflatable tube and/or includes an inflatable component or inflatable section.

In another and/or alternative non-limiting object of the present disclosure, there is the provision of a pet bed wherein an outer surface of the inflatable tube optionally includes a locking tab that is configured to releasably connect to sidewall apertures in the sidewall of the flexible cushion substrate.

In another and/or alternative non-limiting object of the present disclosure, there is the provision of a pet bed comprising a peripheral support and a support material that is connected to the peripheral support. The peripheral support includes a central opening. The peripheral support has a cross-sectional area along a longitudinal axis of the peripheral support. The central opening constitutes about 10-90% (and all values and ranges therebetween) of a cross-sectional area of the inflatable peripheral support. The support material is optionally configured to cover 60-100% (and all values and ranges therebetween) of the central opening. The support material is optionally formed of a flexible and/or stretchable material to create a trampoline-type effect when a pet rests on the support material. The peripheral support is optionally configured to compress to a second compressed state when a downward force is applied to the peripheral support. The peripheral support is optionally configured to decompress to its original uncompressed state when the downward force is removed from the peripheral support. The support material is optionally positioned above the floor surface while the peripheral support is in the uncompressed state and the second compressed state. The support material is optionally connected to a top edge of the central opening of the peripheral support. The support material optionally includes a recessed portion. The recessed portion is optionally positioned below an outer peripheral edge of the support material. The recessed portion optionally includes an opening to enable liquid to pass through the support material.

In another and/or alternative non-limiting object of the present disclosure, there is the provision of a pet bed wherein the peripheral support is optionally an inflatable tube or a foam-filled tube.

In another and/or alternative non-limiting object of the present disclosure, there is the provision of a pet bed wherein an outer surface of the peripheral support includes a fabric material that 1) provides structural support to the peripheral support to inhibit or prevent undue deformation or compression of the peripheral support when a pet lies on the pet bed, 2) inhibits or prevents bursting of the peripheral support, and/or 3) provides a soft surface upon which a pet can lay.

In another and/or alternative non-limiting object of the present disclosure, there is the provision of a pet bed that includes a bolster and wherein the bolster is connected to a top portion of the peripheral support.

In another and/or alternative non-limiting object of the present disclosure, there is the provision of a pet bed wherein the bolster is optionally inflatable and/or is optionally filled with a compressible material.

In another and/or alternative non-limiting object of the present disclosure, there is the provision of a pet bed wherein the bolster is optionally removably connected to the peripheral support by a zipper.

In another and/or alternative non-limiting object of the present disclosure, there is the provision of a pet bed including a cover pad.

In another and/or alternative non-limiting object of the present disclosure, there is the provision of a pet bed wherein the cover pad is configured to overlie 60-100% (and all values and ranges therebetween) of a top surface of the peripheral support, 60-100% (and all values and ranges therebetween) of a top surface of the support material, and/or 0-100 (and all values and ranges therebetween) of a side of the peripheral support.

In another and/or alternative non-limiting object of the present disclosure, there is the provision of a pet bed wherein the cover pad is optionally releasably connected to the peripheral support.

In another and/or alternative non-limiting object of the present disclosure, there is the provision of a pet bed wherein the cover pad is optionally configured to 1) provide a soft surface for the pet bed, 2) create an aesthetically pleasing pet bed, 3) provide protection to the peripheral support from inadvertent damage or puncturing by a pet claw, 4) provide structural strength to the peripheral support, and/or 5) minimize deformation, damage, or bursting of the peripheral support.

In another and/or alternative non-limiting object of the present disclosure, there is the provision of a pet bed wherein the cover pad is optionally form fitted to the peripheral support.

Other aspects, advantages, and novel features of the present disclosure will become apparent from the following detailed description of the disclosure when considered in conjunction with the accompanying drawings.

BRIEF DESCRIPTION OF THE DRAWINGS

The following description and drawings set forth certain illustrative implementations of the disclosure in detail. The illustrated examples, however, are not exhaustive of the many possible embodiments of the disclosure.

FIG. 7 illustrates an exemplary peripheral support in accordance with the present disclosure;

DETAILED DESCRIPTION OF NON-LIMITING EMBODIMENTS

Figure 1:
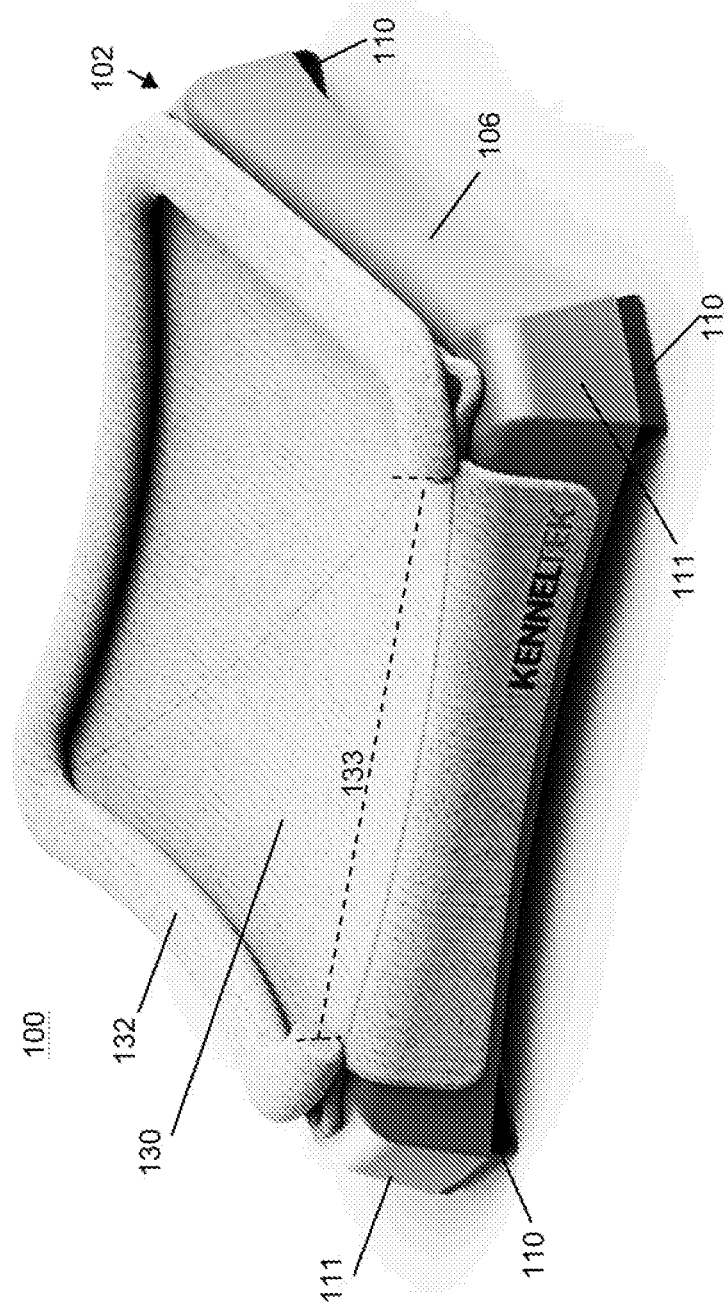
FIG. 1 illustrates an exemplary pet bed in accordance with the present disclosure.

A more complete understanding of the articles/devices, processes and components disclosed herein can be obtained by reference to the accompanying drawings. These figures are merely schematic representations based on convenience and the ease of demonstrating the present disclosure, and are, therefore, not intended to indicate relative size and dimensions of the devices or components thereof and/or to define or limit the scope of the exemplary embodiments.

Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

The singular forms "a," "an," and "the" include plural referents unless the context clearly dictates otherwise.

As used in the specification and in the claims, the term "comprising" may include the embodiments "consisting of" and "consisting essentially of." The terms "comprise(s)," "include(s)," "having," "has," "can," "contain(s)," and variants thereof, as used herein, are intended to be open-ended transitional phrases, terms, or words that require the presence of the named ingredients/steps and permit the presence of other ingredients/steps. However, such description should be construed as also describing compositions or processes as "consisting of" and "consisting essentially of" the enumerated ingredients/steps, which allows the presence of only the named ingredients/steps, along with any unavoidable impurities that might result therefrom, and excludes other components/steps.

Referring now to the drawings wherein the showings are for the purpose of illustrating non-limiting embodiments of the invention only and not for the purpose of limiting same, in accordance with one aspect of the present disclosure and with reference to FIGS. 1-4, a pet bed 100 includes a flexible cushion substrate 102. The flexible cushion substrate 102 includes a top portion 104 and a sidewall 106 connected to and around the perimeter of the top portion 104 and defining a body of the flexible cushion substrate 102. In some non-limiting embodiments, the top surface of the top portion 104 is concave to provide a comfortable shape on the pet bed 100 upon which an animal can lie.

The flexible cushion substrate 102 is made of a flexible material that allows the surface 104 to flex/stretch under the weight on an animal, such as a dog or cat, on the pet bed 100. This provides a similar comfort/give that a pet may experience when lying on a fiber-filled bed. In some non-limiting embodiments, the flexible cushion substrate 102 is made of an elastomer material, for example and without limitation, rubber. In another non-limiting embodiment, the flexible cushion substrate 102 is made of a flexible thermoplastic elastomer (TPE). In some non-limiting embodiments, the flexible cushion substrate 102 is molded into a desired bed shape. The flexible cushion substrate 102 can optionally be formed of an antimicrobial material.

Figure 3:
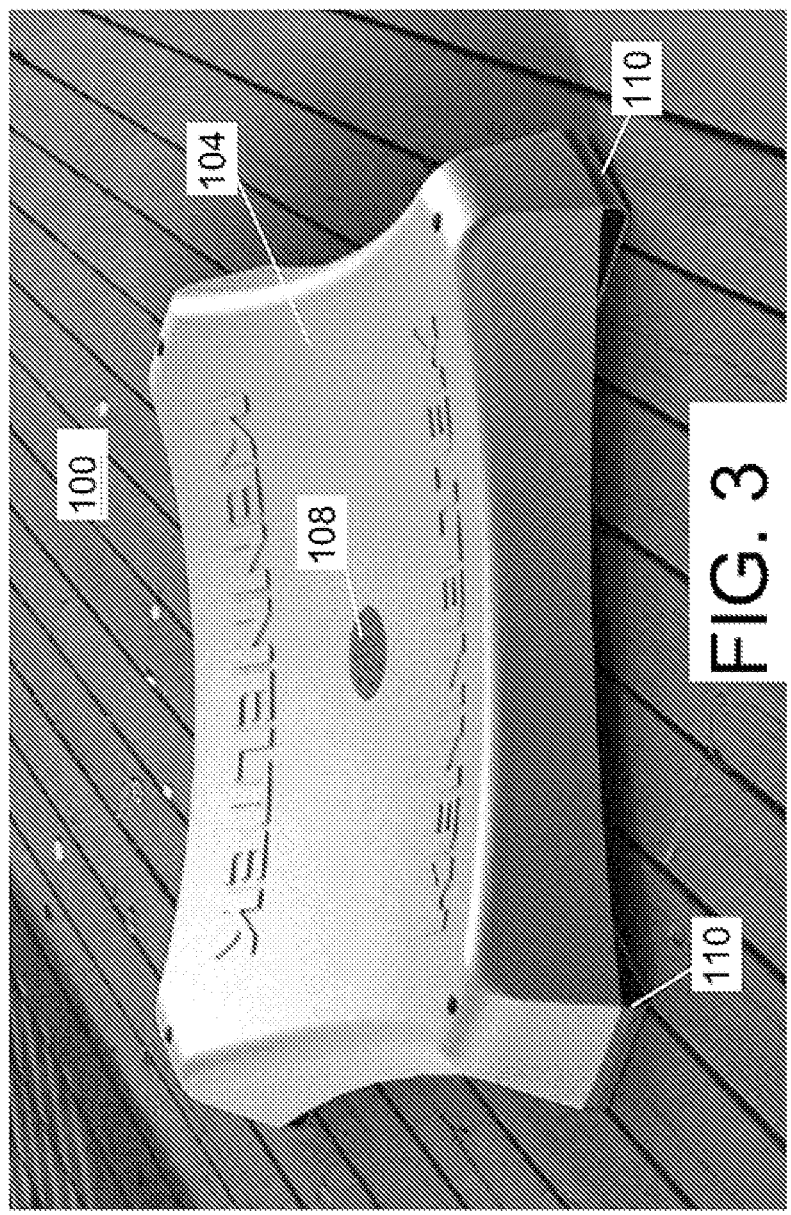
FIG. 3 illustrates an exemplary pet bed without a fabric cover.

In some non-limiting embodiments and with reference to FIG. 3, the top surface of the top portion 104 of flexible cushion substrate 102 is concave and includes one or more perforations 108. The perforations 108 allow moisture such as water, pet urine, and the like to drain through the flexible cushion substrate 102 to the ground. If the pet bed 100 is used as an outdoor product, the plurality of perforations 108 provides a drain preventing rainwater and other moisture from collecting in the pet bed 100.

Figure 2:
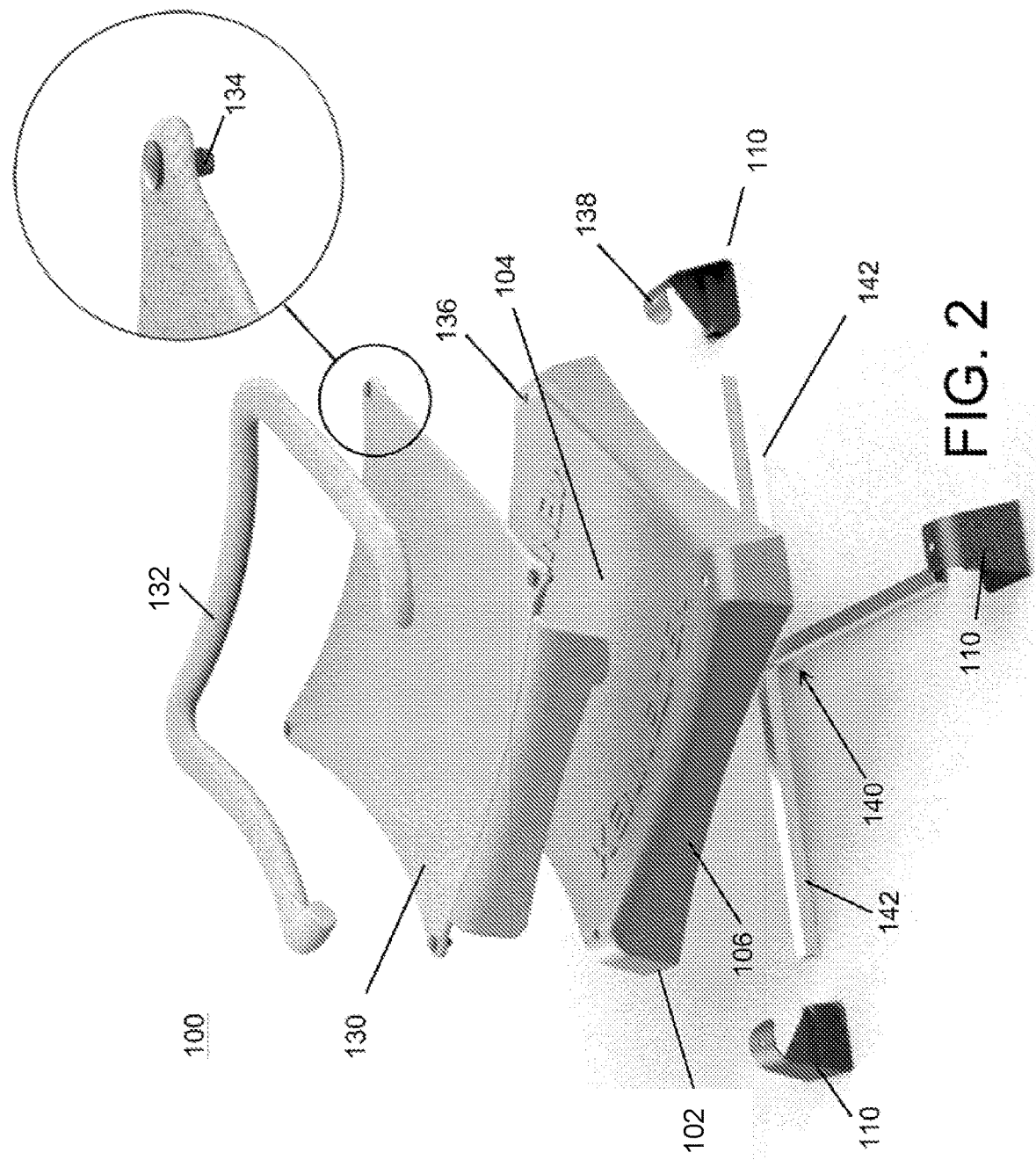
FIG. 2 illustrates an exploded view of the exemplary pet bed of FIG. 1.

With reference to FIGS. 1 and 2, the pet bed 100 also includes a cover pad 130. The cover pad 130 provides a comfort layer on the pet bed 100 for the pet. The cover pad 130 is configured to conform to the top surface of the top portion 104 of the flexible cushion substrate 102. That is, the cover pad 130 may share the concave shape of the top surface of the top portion 104 of the flexible cushion substrate 102. In some non-limiting embodiments, the cover pad 130 is removably attached to flexible cushion substrate 102. The cover pad 130 may be attached to the flexible cushion substrate 102 by one or more fasteners 134. In these non-limiting embodiments, the flexible cushion substrate 102 may include a corresponding fastener receiver 136 adapted to receive and secure fastener 134. While FIG. 2 illustrates the fastener 134 and fastener receiver 136 as a snap button and fastener aperture, respectively, it is to be appreciated that other mechanical fasteners known in the art may be used (e.g., snap, zipper, etc.). The material of the cover pad 130 is generally different from the material used to form the flexible cushion substrate 102. In one non-limiting embodiment, the cover pad is formed of a polyester or nylon material.

In more particular non-limiting embodiments, a peripheral support 110 may also include a corresponding fastener receiver 138 (shown as aperture 138 in FIGS. 2 and 3) for receiving a fastener such as fastener 134. In other non-limiting embodiments, the cover pad 130 is removably attached to the flexible cushion substrate 102 though hook and loop fasteners. In yet still other non-limiting embodiments, a bottom surface of the cover pad 130 has a friction-enhanced surface such as, for example and without limitation, a rubber surface. The friction-enhanced surface minimizes sliding of the cover pad 130 with respect to the flexible cushion substrate 102. When a pet climbs onto the pet bed 100, the cover pad 130 stays in position on the top surface of the top portion 104 of the flexible cushion substrate 102.

In some non-limiting embodiments, the cover pad includes a bolster 132 configured to extend around all or a substantial perimeter portion of the cover pad 130. When the bolster does not extend fully about the perimeter of the cover pad 130, a bolster gap 133 is present on the front of the cover pad 130 defining an area where no bolster 132 present. The bolster gap 132 allows for an animal to easily climb on the bed 100. As illustrated in FIG. 1, a front flap portion of the cover pad 130 extends to cover the side wall of the flexible cushion substrate 102 in the region of the bolster gap 132. The front flap portion of the cover pad 130 extends to cover the side wall of the flexible cushion substrate 102 can be used to protect the side wall from damage as a pet enters and leaves the pet bed and/or functions as a gripping surface to facilitate in enabling the pet to enter or exit the pet bed. As illustrated in FIG. 1, the portion of the cover pad 130 extends to cover at least 50% of the side wall of the flexible cushion substrate 102 located below the region of the bolster gap 132.

In some embodiments, the bolster 132 extends around the entire perimeter of the cover pad 130.

The bolster 132 may be permanently attached to the cover pad 130 or may be removably attached to the cover pad 130. The bolster 132 may removably attach to the cover pad by hook and loop fasteners, button fasteners, zipper fasteners, and the like. In this way, the cover pad 130 and any additional components such as the bolster 132 may be removed, dissembled, and subsequently washed or cleaned. The bolster can be formed of the same or different material from the cover pad. In one non-limiting embodiment, the bolster includes an inflatable tube, foam, or compressible material to provide a compressible bolster.

The cover pad 130 and bolster 132 may be composed of a fabric material such as, for example and without limitation, polyester fabric. In some non-limiting embodiments, the fabric material of the cover pad 130 and bolster 132 are impregnated with materials configured to eliminate and/or reduce odor as well as deter and kill germs. In some no-limiting embodiments, the elements for eliminating odor and/or inhibiting microbial growth include zinc, silver, and/or other micro- and nanoparticles. The cover pad is generally formed of a material that allows liquid to easily flow through the cover pad so that such fluids can exit the pet bed via perforations 108. As can be appreciated, if the pet bed is to be used outdoors, the cover pad can be optionally removed from the pet bed during use of the pet bed by the pet outdoors.

With reference to FIGS. 1-4, the pet bed 100 includes at least one peripheral support 110. The at least one peripheral support 110 is configured to engage and suspend the flexible cushion substrate 102 above a floor surface when the pet bed is positioned on a floor surface. The peripheral supports 110 provide a mechanism for suspending the flexible cushion substrate 102 above the ground/floor surface such that the sidewall 106 does not contact the ground. The peripheral supports 110 can also provide additional flexing and cushioning to an animal on the pet bed 100. When an animal climbs on the bed 100, the peripheral supports 110 experience a downward force 120 and flex to a second compressed state 117 in response to the downward force 120.

In some non-limiting embodiments, the at least one peripheral support 110 is configured to engage at least one corner 111 of the pet bed 100. Generally, the peripheral support 110 is configured to wedge into a portion of the underside of the flexible cushion substrate 102 to create a friction engagement between the peripheral support 110 and the flexible cushion substrate 102; however, other or additional connection arrangement can be used.

Although the pet bed 100 is illustrated as a substantially rectangular shape having four corners 111, it is to be appreciated that the pet bed 100 may have other shapes that include corners 111. For example and without limitation, the pet bed 100 may be substantially triangular in shape having three corners and/or pentagonal in shape having five corners. As can also be appreciated, the pet bed may be circular or oval in shape having no corners.

Figure 4:
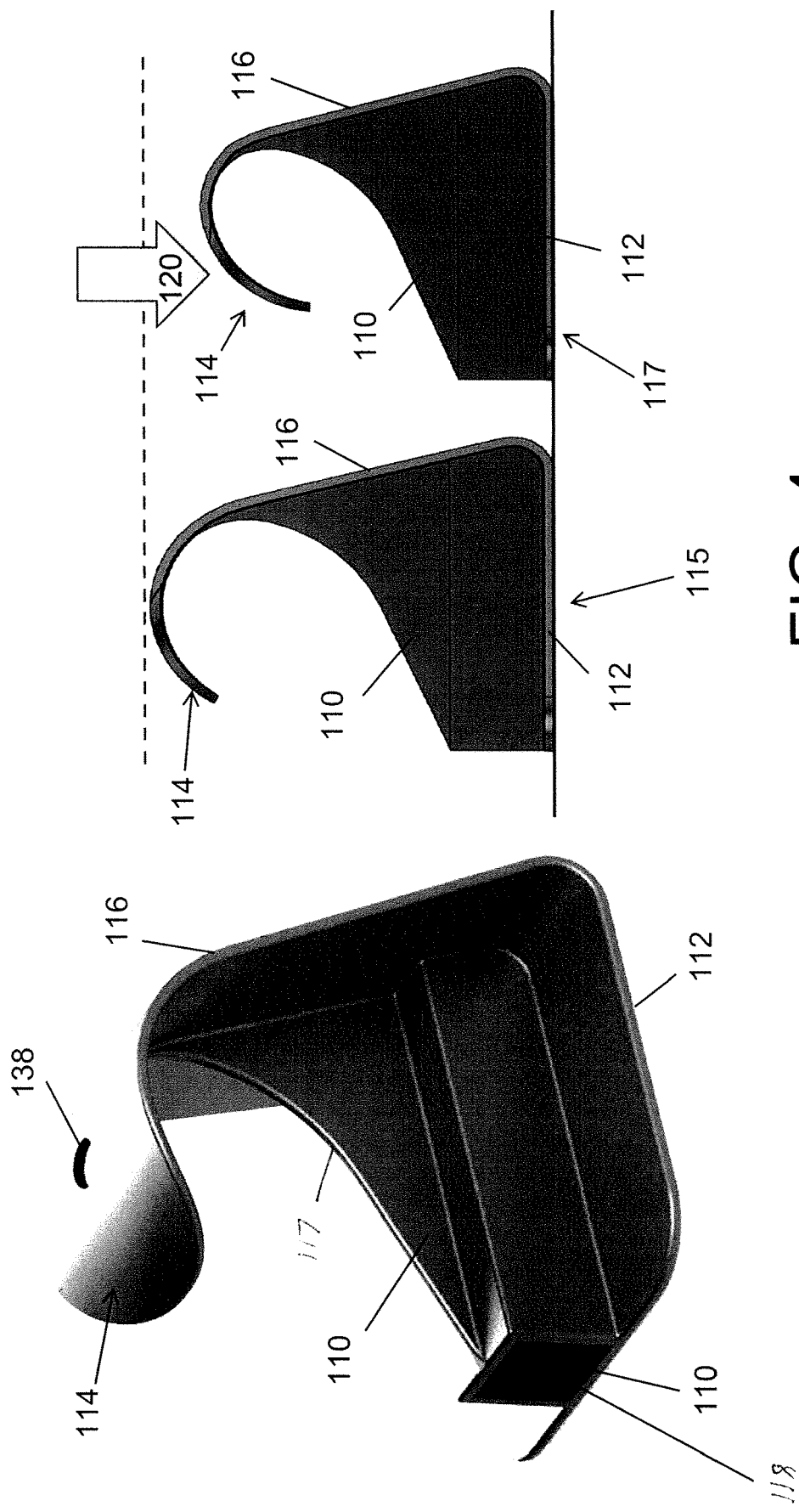
FIG. 4 illustrates an exemplary peripheral support in accordance with the present disclosure.

In some non-limiting embodiments and with reference to FIG. 4, the peripheral support 110 includes a base 112, a cantilever portion 114, and a support wall 116 connecting the base 112 to the cantilever portion 114. The width of the base 112 is generally greater than the width of the cantilever portion 114. The longitudinal length of the base 112 is generally greater than the longitudinal length of the cantilever portion 114. The support wall 116 can optionally include a support rib 117 that is connected to the inner surface of the support wall 116 to provide additional structural strength to the support wall 116. The support rib 117 can optionally have a variable thickness along its longitudinal length as illustrated in FIG. 4. The width of the support rib 117 can optionally be constant along its longitudinal length as illustrated in FIG. 4. The support rib 117 is typically connected to a portion of the base 112 as illustrated in FIG. 4; however, this is not required. The width of the support rib 117 is generally less (e.g., 0.5-20% and all values and ranges therebetween) the width of the support wall 116. As illustrated in FIG. 4, the support wall 116 optionally angles upwardly and a portion of the support wall 116 overlies a top surface of the base 112. As illustrated in FIG. 4, 80-100% (and all values and ranges therebetween) of the cantilever portion 114 overlies the base 112.

The cantilever portion 114 is resilient such that the cantilever portion 114 can flex from a first position 115 to a second downward compressed position 117 in response to a downward force 120 (for example, an animal climbs on the pet bed 100). When a downward force 120 is no longer present (for example, the animal climbs off the bed), the cantilever portion 114 returns to the first position 115.

In some non-limiting embodiments, the peripheral support 110 is made of a lightweight metal such as, for example and without limitation, aluminum. In other non-limiting embodiments, the peripheral support 110 is made of a plastic material such as, for example and without limitation, polyurethane.

In some non-limiting embodiments and with reference to FIGS. 2 and 4, the at least one peripheral support 110 includes at least one channel 118 for receiving a frame member 142. The channel 118 allows the frame system 140 comprised of frame members 142 to connect multiple peripheral supports 110 together. That is, the frame members 142 engage the channel 118 of the peripheral supports 110 to define a base to support and suspend the flexible cushion substrate 102.

The frame members 142 of the frame system 140 are generally composed of a rigid material to provide an ample structure and support to the pet bed 100. In some embodiments, the frame members 142 are made of a metal such as, for example and without limitation, aluminum. In other non-limiting embodiments, the frame members are made of a rigid plastic such as, for example and without limitation, PVC.

In some non-limiting embodiments and with reference to FIG. 2, the frame members 142 radially extend from a center position 135 to corners 111 of the flexible cushion substrate 102. That is, each peripheral support 110 includes one channel 118 for receiving single frame member 142. In other non-limiting embodiments and with reference to FIGS. 5 and 7, the frame members 242 extend along the perimeter of the flexible cushion substrate 102. That is, each peripheral support 210 includes two channels 218 defining a corner angle 219 for receiving multiple frame members 242. It is to be appreciated that the corner angle 219 mirrors the shape of the corresponding pet bed. For example, in some non-limiting embodiments wherein the pet bed 200 is substantially rectangular, the corner angle 219 is about 90°. In other embodiments, such as pet beds that are substantially pentagonal in shape, the corner angle 219 is about 108°. In yet still other non-limiting embodiments, such as pet beds that are substantially triangular in shape, the corner angle is about 60°. As can be appreciated, the pet bed can have other shapes.

With reference now to FIGS. 5-10, there is illustrated a pet bed 200 that is similar to pet bed 100, but has a slightly different configuration. As such, most of the features of pet bed 100 are also included in pet bed 200, thus will not be repeated herein. Pet bed 200 includes a flexible cushion substrate 202, top portion 204, and sidewall 206 analogous to the substrate 102, top portion 104, and sidewall 106 as described in greater detail above. The sidewall 206 includes one or more sidewall apertures 207 configured to engage with a locking tab 217 located on the outwardly facing support wall 216 of a peripheral support 210. When the locking tab 217 is engaged with the sidewall aperture 207, the flexible cushion substrate 202 is secured to the frame system 240. In this way, the pet bed 200 may be lifted and moved to a different location while minimizing the possibility that the frame system 240 may dissemble during transport.

The pet bed 200, like the exemplary pet bed 100, also includes a top surface of the top portion 204 that is concave. The pet bed 200 may also include one or more perforations 208 located centrally on the flexible cushion substrate 202. The perforations 208 provide a drain function to remove collected moisture from the pet bed 200. The concave surface aids in funneling any moisture or fluid to the centrally located plurality of perforations 208 and off the pet bed 200.

Figure 5:
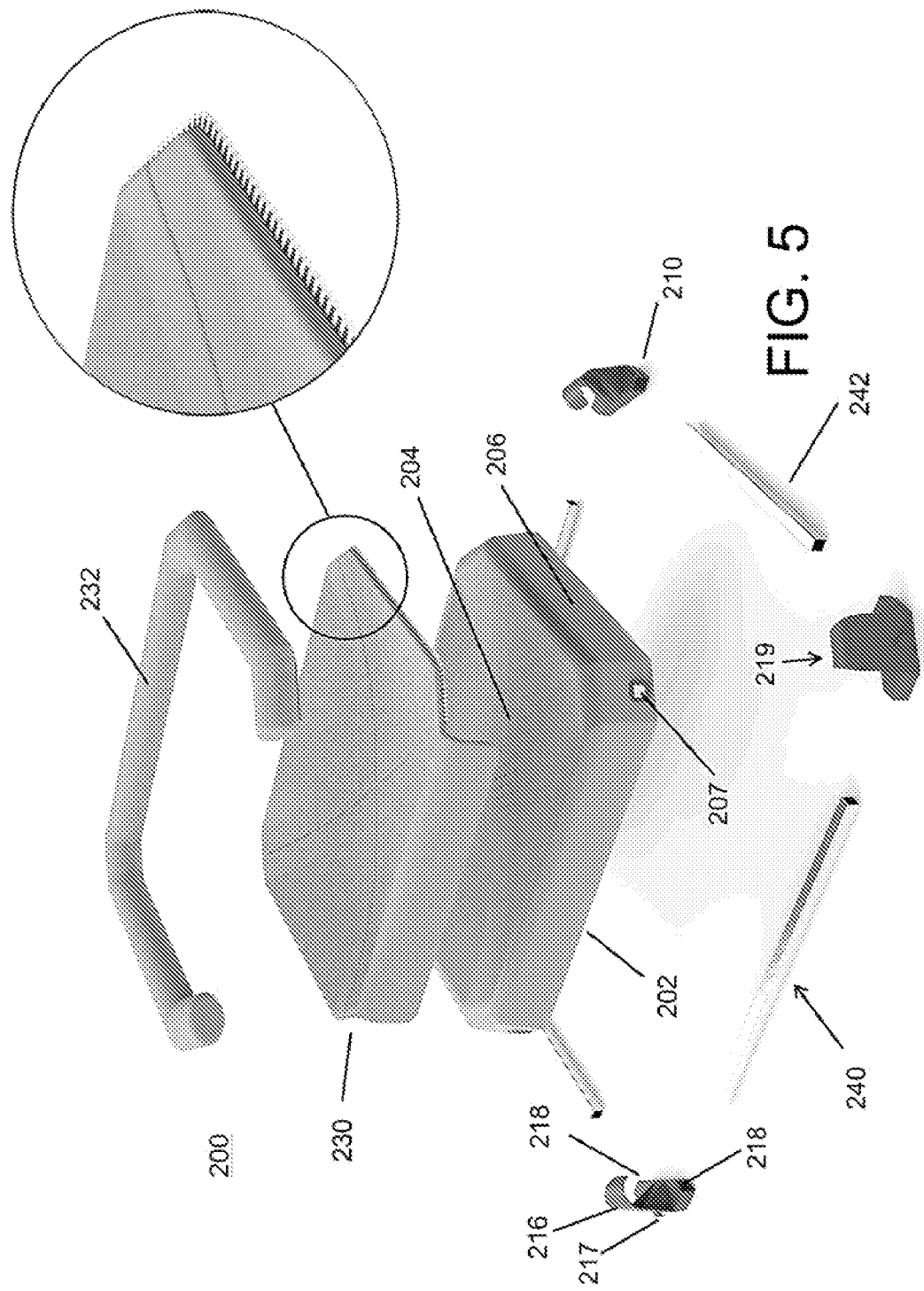
FIG. 5 illustrates an exploded view of another exemplary pet bed in accordance with the present disclosure.
Figure 6:
FIG. 6 illustrates the exemplary pet bed of FIG. 5.
Figure 8:
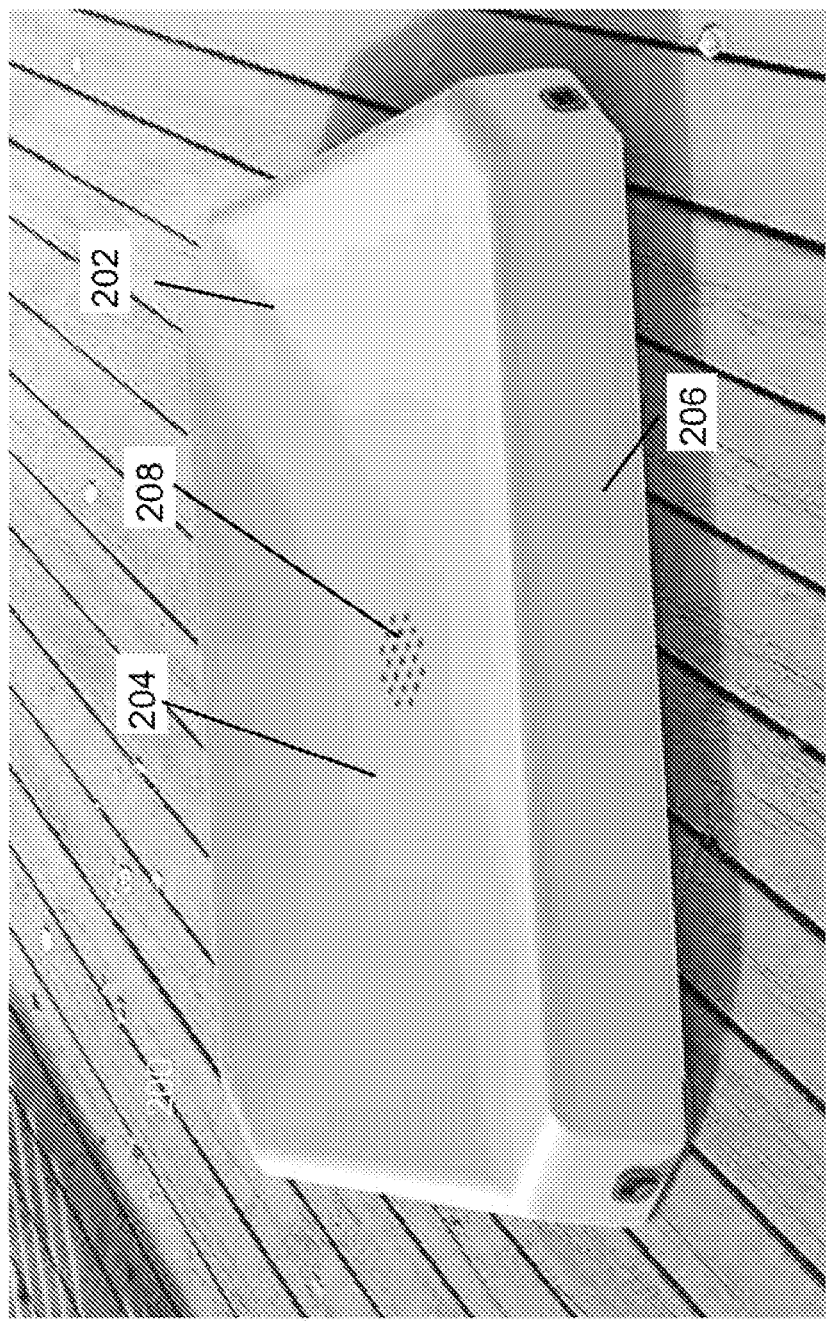
FIG. 8 illustrates the exemplary pet bed of FIG. 5 without a cover pad.

As illustrated in FIG. 5, the bolster 232 is configured to be releasably connected to the cover pad 230 via a zipper; however, other connection arrangements can be used to releasably connect the bolster to the cover pad. The cover pad 230 can be connected to the flexible cushion substrate 202 by a fastener similar to fastener 134 in FIG. 2, or by some other means (e.g., adhesive, zipper, etc.).

The pet beds 100 and 200 are configured to be easily shipped in a small box, easy to assembly and disassemble, easy to clean, require no tools to assemble or disassemble, provide cushion and flex comfort for the pet on the pet bed, enable drainage of liquids from the pet bed, and/or can be formed of odor-resistant and/or microbial growth-inhibiting materials.

Figure 9:
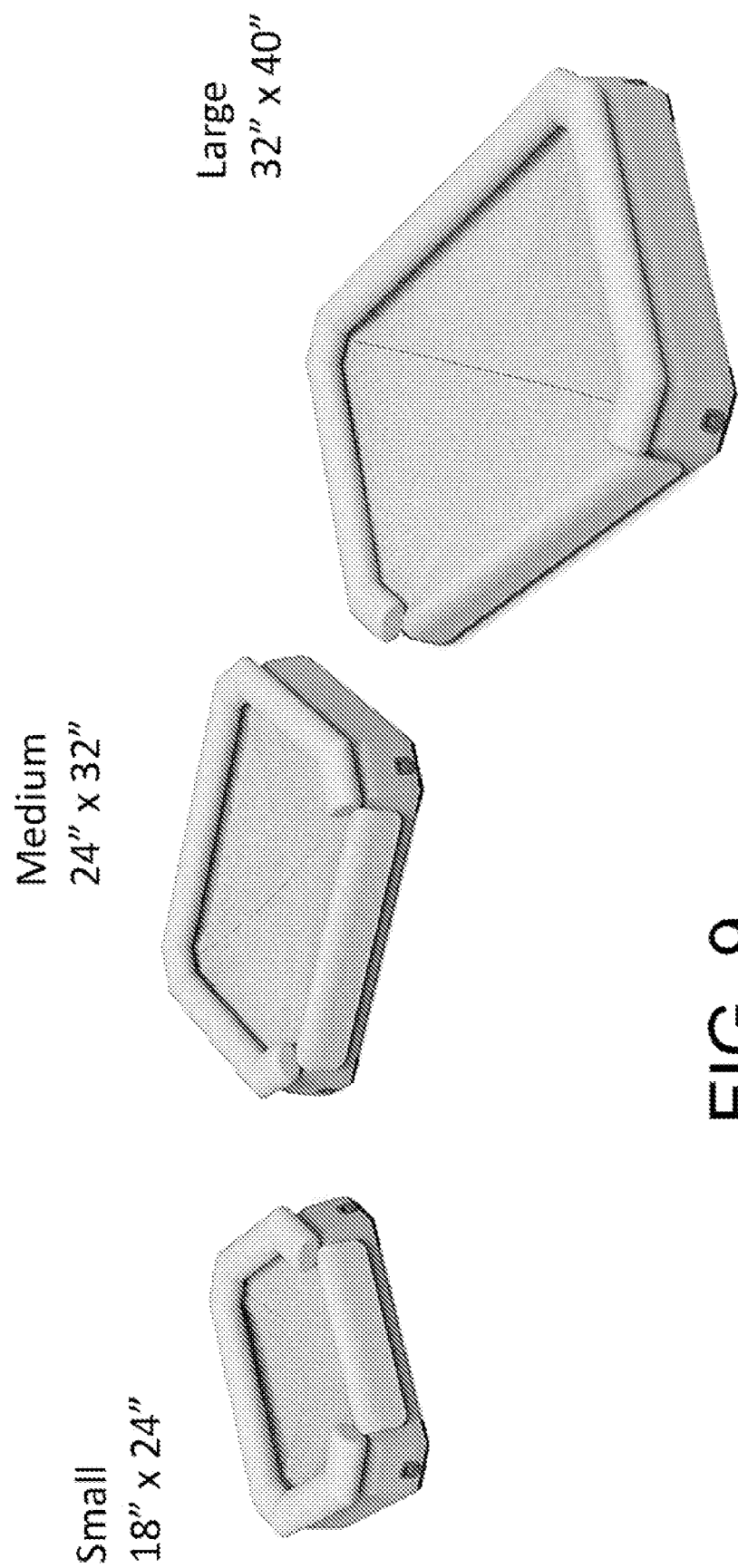
FIG. 9 illustrates non-limiting sizes of exemplary pet beds in accordance with the present disclosure.
Figure 10:
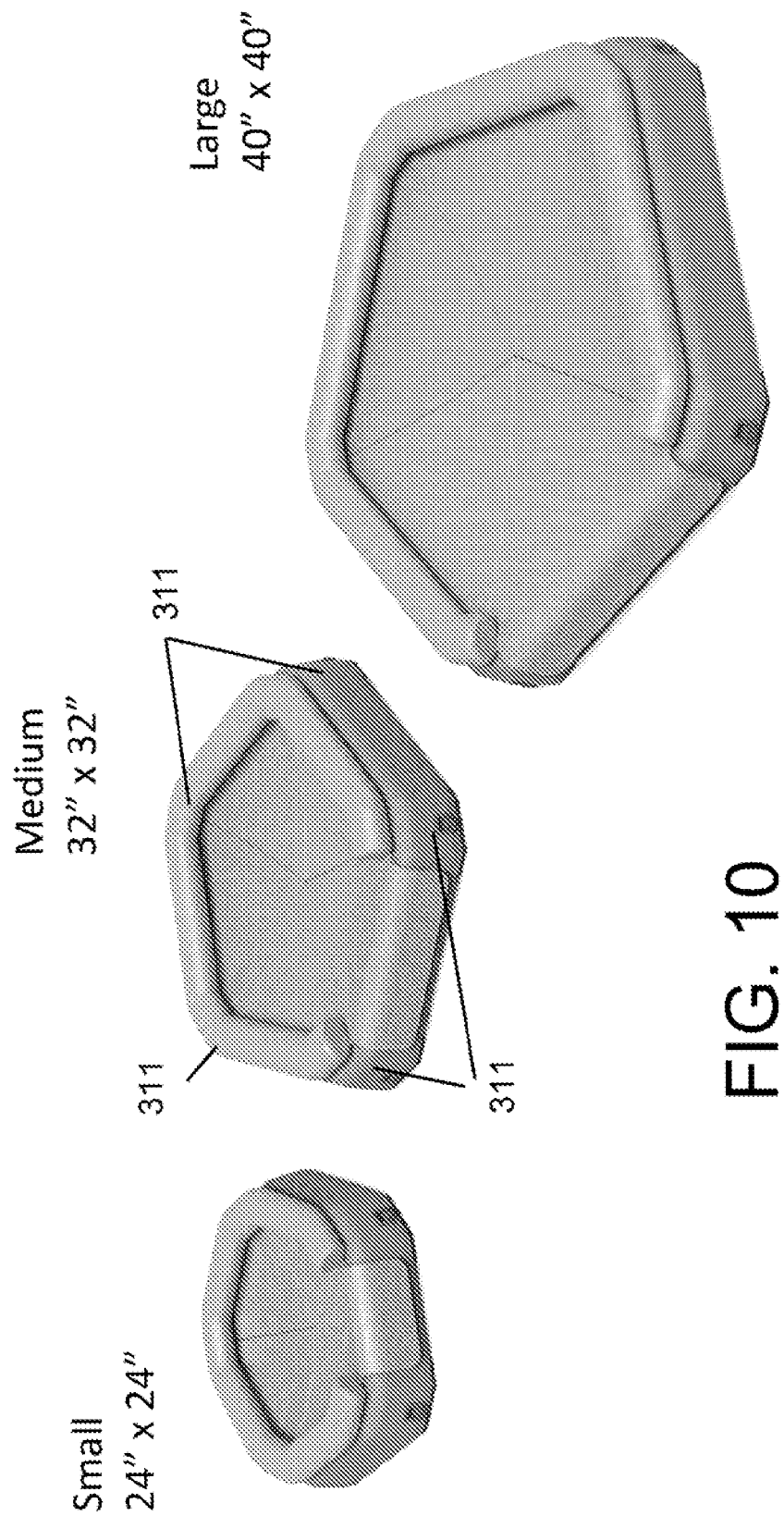
FIG. 10 illustrates pet beds of non-limiting shapes and sizes.

FIG. 9 illustrate that the present exemplary embodiments can be incorporated into pet beds of various sizes, such as a small, medium, and large size, corresponding to pets of varying sizes. For example and without limitation, a substantially rectangular pet bed may have dimensions of about 18 in. by about 24 in., about 24 in. by about 32 in., and about 32 in. by about 40 in. FIG. 10 illustrates that the present exemplary embodiments can be incorporated into pet beds of varying shapes (as well as sizes). For example and without limitation, the pet bed may be substantially pentagonal in shape, including five corners 311. Non-limiting dimensions of these pet beds are illustrated in FIG. 10.

Figure 11:
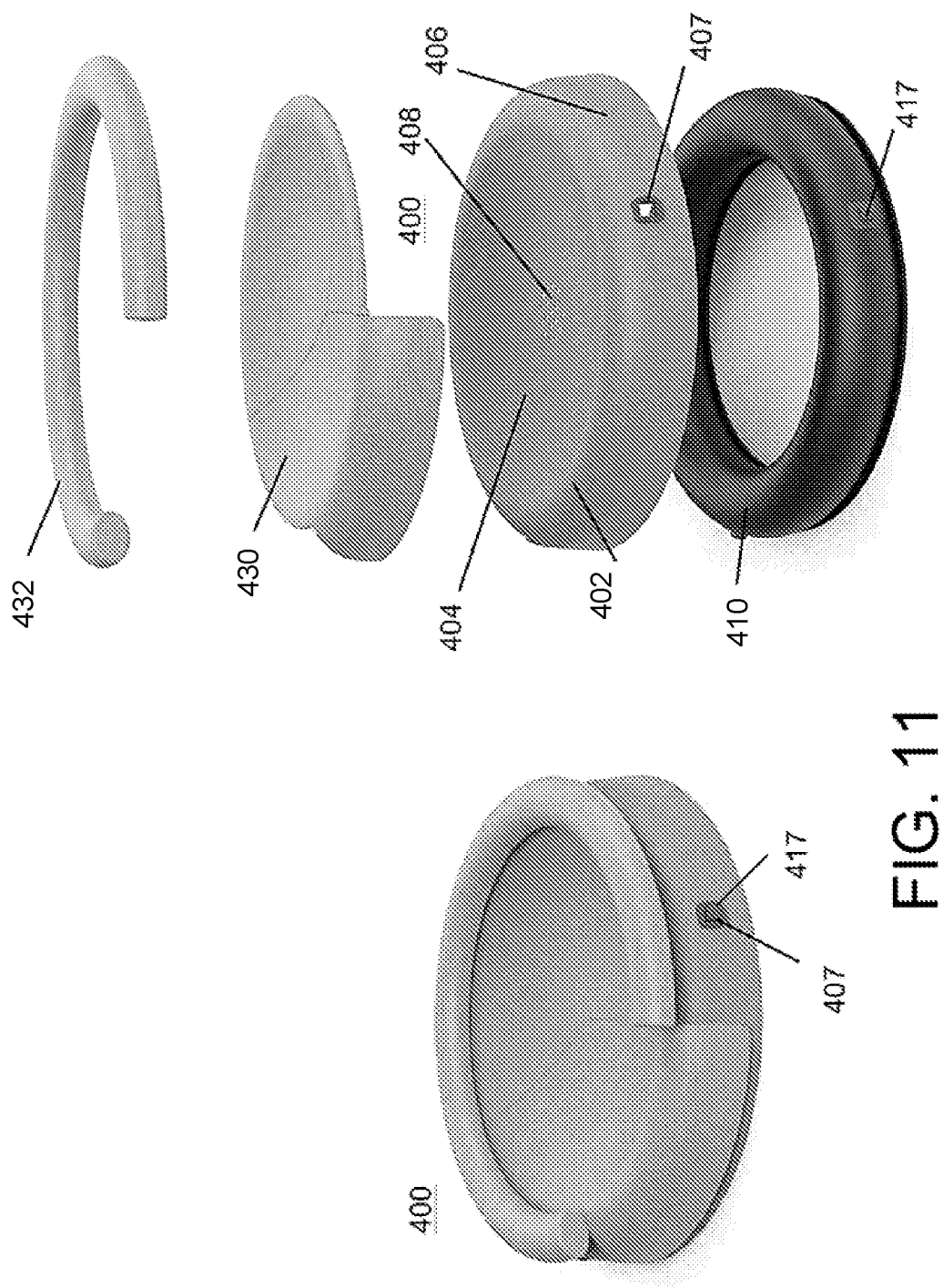
FIG. 11 illustrates another exemplary pet bed and an exploded view of the pet bed in accordance with the present disclosure.

Referring now to FIG. 11, there is illustrated another non-limiting configuration of a pet bed 400. Pet bed 400 is illustrated has having a generally circular shape; however, it can be appreciated that the pet bed can have other shapes (e.g., elliptical, square, rectangular, oval, triangular, trapezoidal, and other polygonal shapes). The pet bed 400 includes a flexible cushion substrate 402 having a top portion 404 and sidewall 406. The top surface of the top portion 404 can have an optional concave shape wherein the middle portion of the top surface 404 is lower than the peripheral edges. Such a configuration results in liquid on the top surface of the top portion 404 moving by gravity to the central portion of the top surface 404. The flexible cushion substrate 402 is generally formed of a flexible and durable material (e.g., plastic material, vinyl material) so that the flexible cushion substrate 402 can be outdoors without damaging the flexible cushion substrate 402. Generally, the flexible cushion substrate 402 is formed of a nonabsorbent material or a waterproof material or a water-resistant material.

The top portion 404 optionally includes one or more openings or perforations 408 to facilitate drainage of accumulated water, moisture, and other fluids.

The pet bed 400 includes a peripheral support 410 configured to engage and suspend the flexible cushion substrate 402.

The peripheral support 410 is configured to engage and suspend the flexible cushion substrate 402 above a floor surface when the pet bed is positioned on a floor surface. The peripheral support 410 is configured to provide additional flexing and cushioning to an animal on the pet bed. The peripheral support 410 is configured to compress to a second compressed state when a downward force is applied to the flexible cushion substrate 402. The peripheral support 410 is configured to decompress to its original uncompressed state when the downward force is removed from the flexible cushion substrate 402. The flexible cushion substrate 402 is positioned above the floor surface while the peripheral support 410 is in the second compressed state and the uncompressed state.

In some non-limiting embodiments, the peripheral support 410 is an inflatable tube. That is, a user may inflate the peripheral support 410 with air to obtain a peripheral support for supporting and suspending the flexible cushion substrate 402 above a floor surface when pet bed is positioned on a floor. The peripheral support 410 can be formed of a single piece of flexible material such as plastic or rubber or vinyl material. In yet still other non-limiting embodiments, the peripheral support 410 can be formed of a plurality of arc-like pieces. As illustrated in FIG. 11, the peripheral support 410 is a continuous circular/elliptical structure; thus, the need for a frame system such as frame systems 140 or 240 as discussed above is not required. The peripheral support 410 can be used to provide a framing function and an overall structure to the pet bed 400. The peripheral support is illustrated as being generally donut-shaped; however, other shapes can be used. The peripheral support 410, when in the form of an inflatable tube, is configured to compress when a downward force (e.g., weight of a pet while located on the pet bed), and to decompress when the downward force is removed.

The peripheral support 410 can optionally include a plurality of locking tabs 417 configured to engage sidewall apertures 407 in the flexible cushion substrate 402. When the locking tabs 417 are used, the locking tabs are configured to engage with the sidewall apertures 407, and thereby the flexible cushion substrate 402 is secured to the peripheral support 410. In this way, the pet bed 400 can be lifted and moved to a different location while minimizing the possibility that the bed 400 may become disassembled during transport. Because the peripheral support 410 is inflatable, the tabs 417 can be simply disengaged from the sidewall apertures 407 in the flexible cushion substrate 402 by deflating the peripheral support 410 or by merely pressing tabs 417 inwardly to cause the tabs 417 to exit the sidewall apertures 407.

The bottom side of the flexible cushion substrate 402 includes a recessed region that is configured to receive the top side of the peripheral support 410. As illustrated in FIG. 11, the top side of the peripheral support 410 is curved and the recessed region in the bottom side of the flexible cushion substrate 402 can be configured to have a corresponding shape.

The sides of the flexible cushion substrate 402 are sized such that when the flexible cushion substrate 402 flexible cushion substrate 402 is positioned in the fully inflated peripheral support 410, the bottom of the sides are spaced above a floor surface when the pet bed is positioned on the floor surface. Generally, the bottom of the sides is spaced about 0.25-2 in. (and all values and ranges therebetween) above the floor surface. Also, the sides of the flexible cushion substrate 402 are sized such that when the flexible cushion substrate 402 flexible cushion substrate 402 is positioned in the fully inflated peripheral support 410, the sides overlie at least 50% of the outer side of the peripheral support 410, and typically overlie about 55-98% (and all values and ranges therebetween) of the outer side of the peripheral support 410.

The pet bed 400 can optionally include a cover pad 430 and bolster 432. The optional cover pad 430 and the optional bolster 432 can be the same or similar to cover pad 130 and bolster 132 as discussed above; however, this is not required.

The cover pad 430 can be formed of a durable plastic or foam material which can be optionally water-resistant or waterproof so that the cover pad 430 can be used for outdoor use (e.g., flexible TPE material, etc.). In such a configuration, the cover pad can be molded; however, this is not required. In such a configuration, the cover pad 430 can be easily cleaned by simply spraying water form a hose onto the surface of the cover pad 430.

As can be appreciated, the cover pad 430 can optionally be formed of a fabric material (e.g., polyester, nylon, etc.) so that the cover pad 430 can be washable in a washing machine.

If the cover pad 430 is formed to be water-resistant or waterproof, the cover pad can include one or more openings or slots to allow liquid to pass through the cover pad. If the cover pad 430 is permeable to liquids, one or more openings or slots in the cover pad 430 are not needed.

If the cover pad 430 is a molded, the shape of the cover pad is generally formed to be the same or similar to the top surface of the top portion of the flexible cushion substrate 402. As illustrated in FIG. 11, the cover pad 430 has a concave shape such that the central region of the cover pad is recessed below the peripheral edge of the cover pad such that liquid on the top surface of the cover pad will flow by gravity to the central region of the cover pad. If the cover pad 430 includes one or more slots or openings in the central region, liquid can flow through the cover pad via such openings or slots and on to the top surface of the flexible cushion substrate 402. If the central region of the top surface of the top portion of the flexible cushion substrate 402 includes one or more openings or slots, the liquid that has passed through cover pad 430 and also pass through the flexible cushion substrate 402.

The optional bolster 432 can be formed of the same, similar or different material from the cover pad. The bolster 432 is illustrated as having a generally circular cross-sectional shape; however; other cross-sectional shapes can be used. Generally, the bolster 432 is configured to be compressible. The bolster 432 can include a compressible foam material (e.g., polyurethane material, etc.) or can include one or more inflatable tubes.

As illustrated in FIG. 11, the bolster 432 is configured to only encircle a portion (e.g., 55-85%) of the outer perimeter of the flexible cushion substrate 402. The bolster 432 can be removable or permanently connected to the flexible cushion substrate 402. When the bolster 432 is permanently connected to the flexible cushion substrate 402, the connection can be by stitching, adhesive, melted bond, etc. When the bolster 432 is removably connected to the flexible cushion substrate 402, the connection can be by a zipper, hook and loop fastener, mushroom stem connectors, snaps, buttons, etc.

As illustrated in FIG. 11, the region of the flexible cushion substrate 402 that does not include a bolster, the cover pad can optionally include a front flap portion that extends partially or fully over the outer surface of the flexible cushion substrate 402. When a front flap portion is formed on the cover pad, the front flap portion is generally configured to cover 50-100% of the outer surface of the flexible cushion substrate 402. As illustrated in FIG. 11, the bottom of the front flap portion is configured to be spaced above a floor surface when the pet bed is positioned on the floor surface.

Figure 12:
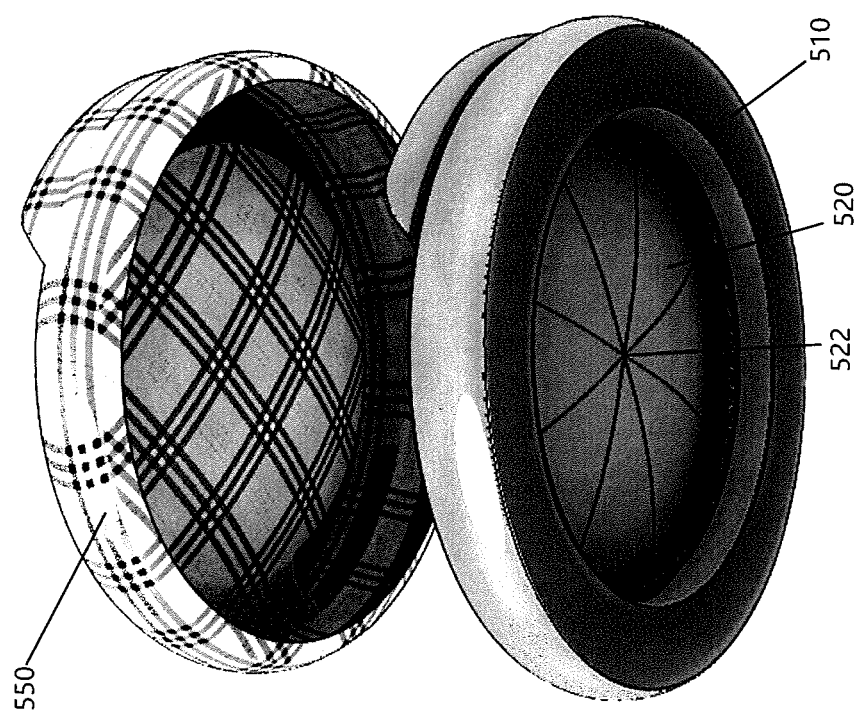
FIG. 12 illustrates another exemplary pet bed and an exploded view of the pet bed in accordance with the present disclosure.

Referring new to FIGS. 12-19, a modification to pet bed 400 is illustrated. Pet bed 500 includes a single peripheral support 510. In some non-limiting embodiments, the peripheral support 510 is an inflatable tube. The outer peripheral cross-sectional shape of peripheral support 510 along its longitudinal axis is non-limiting (e.g., circular as illustrated in FIG. 12, oval, square, polygonal, etc.). When the outer peripheral cross-sectional shape of peripheral support 510 along its longitudinal axis is circular, the peripheral support 510 as generally donut-shaped when fully formed or fully inflated.

The material used to form support 510 is non-limiting (e.g., flexible rubber material, flexible synthetic rubber material, vinyl, etc.).

The outer surface of the peripheral support 510 can optionally include a fabric material that can be used to 1) provide structural support to peripheral support 510 to inhibit or prevent undue deformation or compression of the peripheral support 510 when a pet lies on the pet bed, 2) inhibit or prevent the bursting of the inflatable component of the peripheral support 510, and/or 3) provide a soft comfortable surface upon which the pet can lay.

Figure 13:
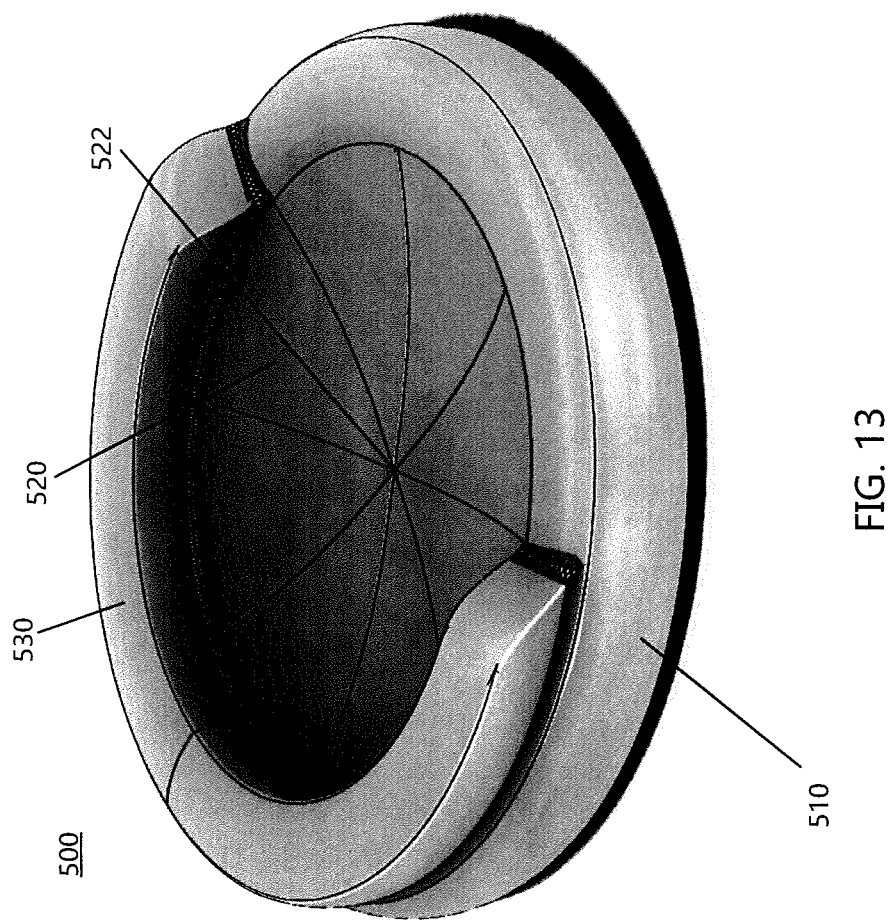
FIG. 13 illustrates the exemplary pet bed without a fabric cover.
Figure 14:
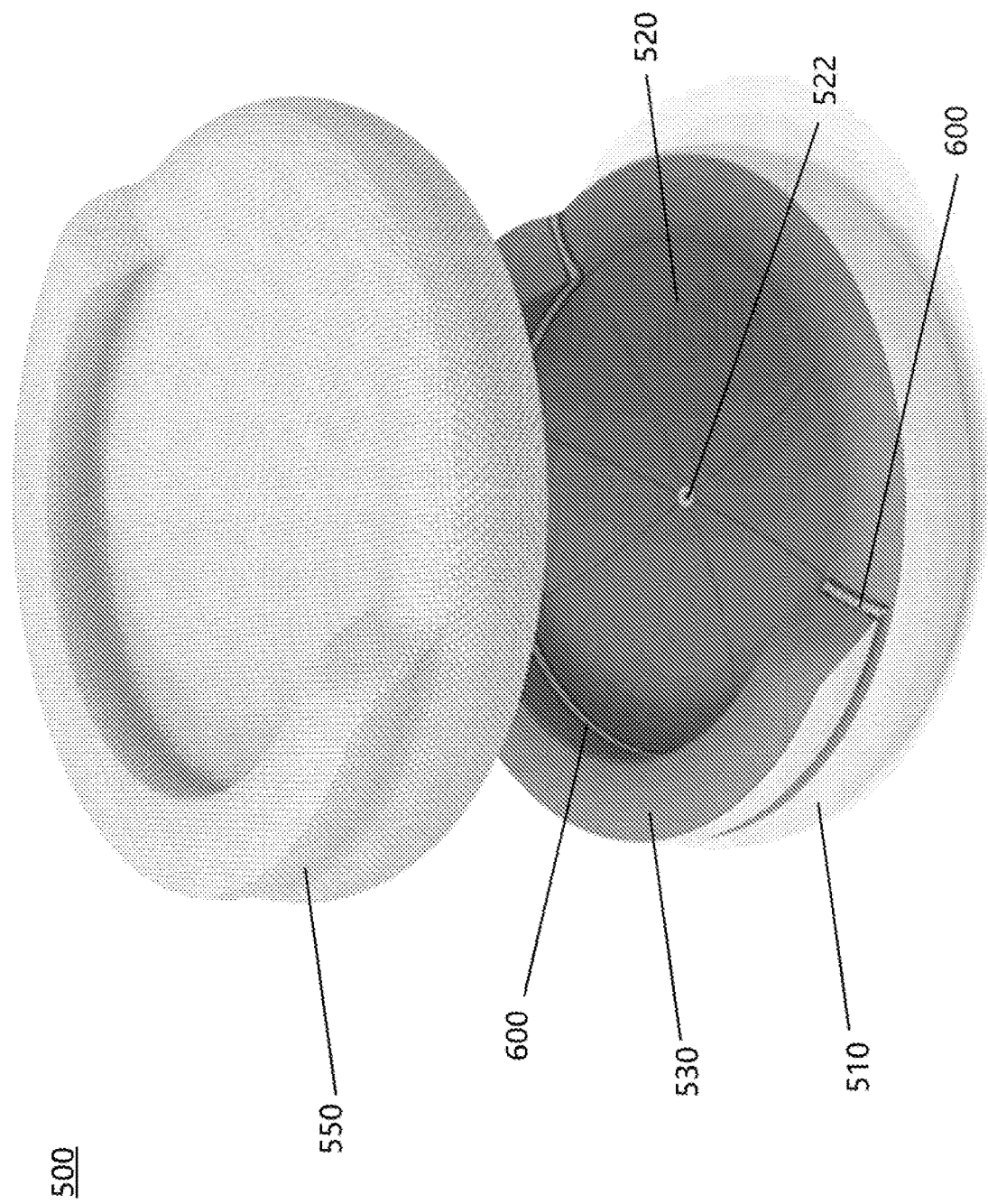
FIG. 14 illustrates another exemplary pet bed and an exploded view of the pet bed in accordance with the present disclosure.

As illustrated in FIGS. 12 and 13, the peripheral support 510 includes a large central opening. For example, when the peripheral support 510 has a circular cross-sectional shape along the longitudinal axis and the central opening is circular, the central opening has a diameter that is about 20-90% (and all values and ranges therebetween) the diameter of the circular cross-sectional shape of the peripheral support 510 that is along its longitudinal axis, and typically 50-90% the diameter of the circular cross-sectional shape of the peripheral support 510 that is along its longitudinal axis, and more typically 55-80% the diameter of the circular cross-sectional shape of the peripheral support 510 that is along its longitudinal axis A support material 520 is connected to one or both sides of support 510 and covers the central opening in peripheral support 510. The support material 520 can be formed of the same or different material from peripheral support 510. The support material 520 is generally formed of a flexible material. The support material 520 can optionally be formed of a stretchable material to create a trampoline type effect when a pet rests on the support material.

As illustrated in FIGS. 12 and 13, the support material 520 is connected to the top edge of the opening in the peripheral support 510. The type of connection between the support material 520 and the peripheral support 510 is non-limiting (e.g., stitching, adhesive, melted seam, hook and loop fastener, zipper, snaps, clips, cord and loops, hooks, etc.). In one non limiting arrangement, the connection between the support material 520 and the peripheral support 510 is formed by stitching and/or a melted seam.

Figure 15:
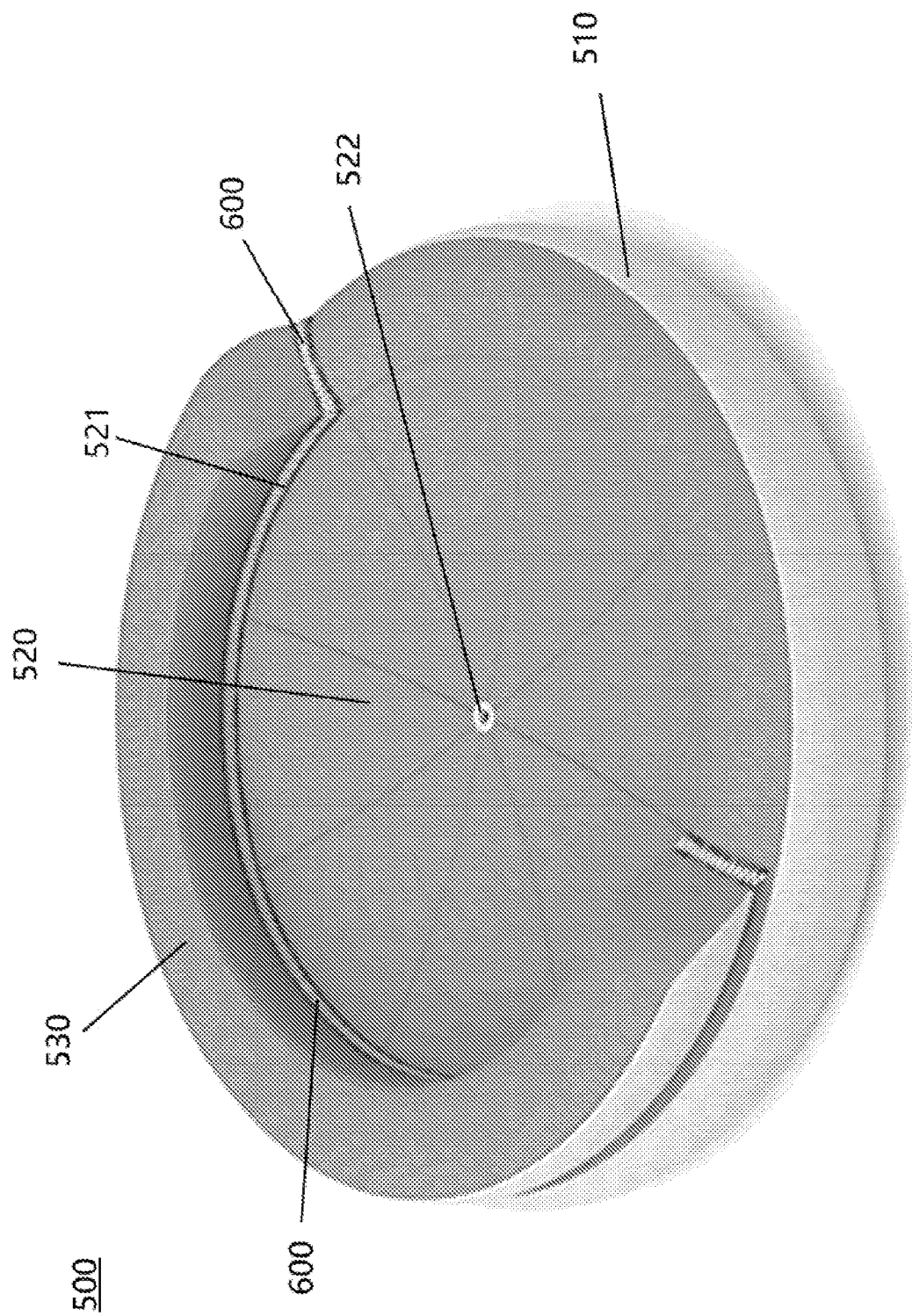
FIG. 15 illustrates the exemplary pet bed without a fabric cover.
Figure 16:
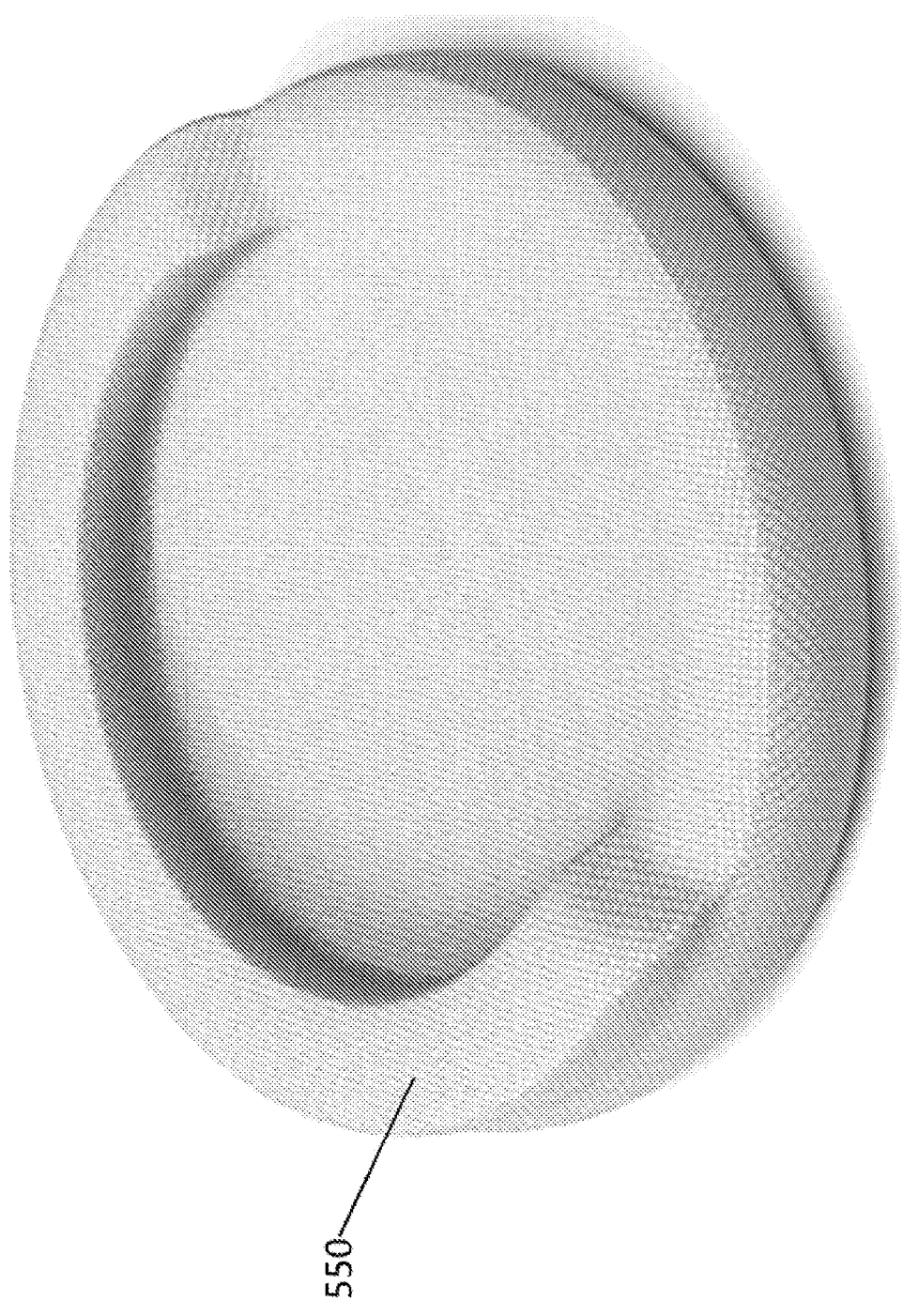
FIG. 16 illustrated the fabric cover inserted into the bottom portion of the pet bed.

The support material 520 can optionally be configured to form a recessed portion that is configured to collect liquids. In such an arrangement, one or more portions of the support material 520 can include an opening 522 to enable liquid to pass through the support material; however, this is not required. As illustrated in FIG. 13, the central region of the support material 520 is positioned below the peripheral edge of the support material 520. As illustrated in FIG. 15, the opening 522 can optionally be formed of a tube material (e.g., PVC tube or disk, etc.) that is connected (e.g., adhesive, melted connection, etc.) to the support material.

The support material 520 can be formed of a single piece of material or be formed of a plurality of pieces of material. As illustrated in FIG. 13, the support material 520 is a plurality of pieces of material that are connected together (e.g., stitching, melted seam, adhesive, etc.).

As illustrated in FIG. 12, the support material 520 can be configured to be positioned above a floor surface when the peripheral support 510 is fully formed or fully inflated. Also, the support material 520 can be configured to be positioned above a floor surface when the peripheral support 510 is fully formed, fully inflated, and when a pet is positioned on the pet bed.

Figure 17:
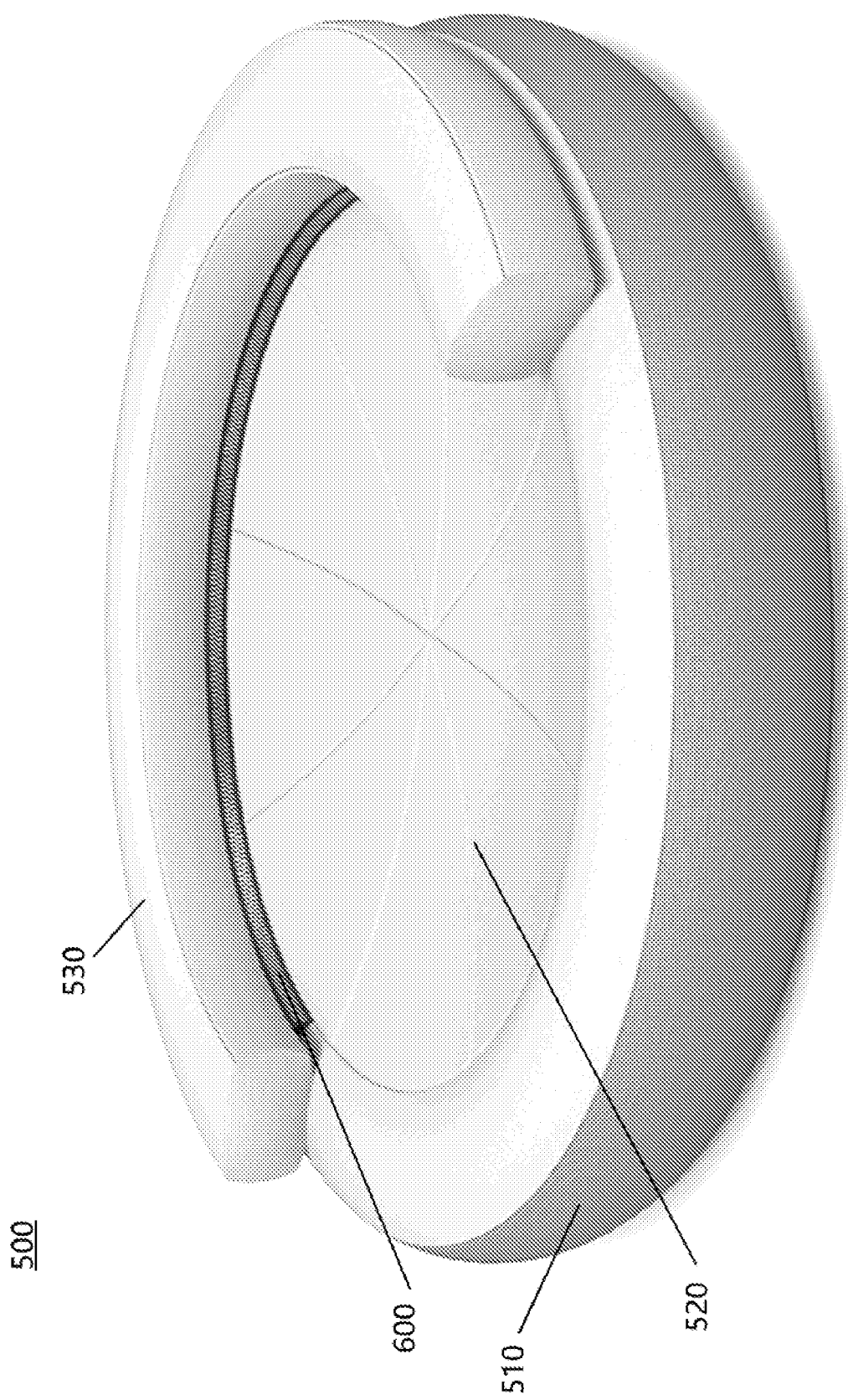
FIG. 17 is another exemplary bottom portion of a pet bed.
Figure 18:
FIG. 18 illustrates the bottom portion of the pet bed of FIG. 17 that is absent the bolster; and, FIG. 19 illustrates the bolster of FIG. 17.
Figure 19:
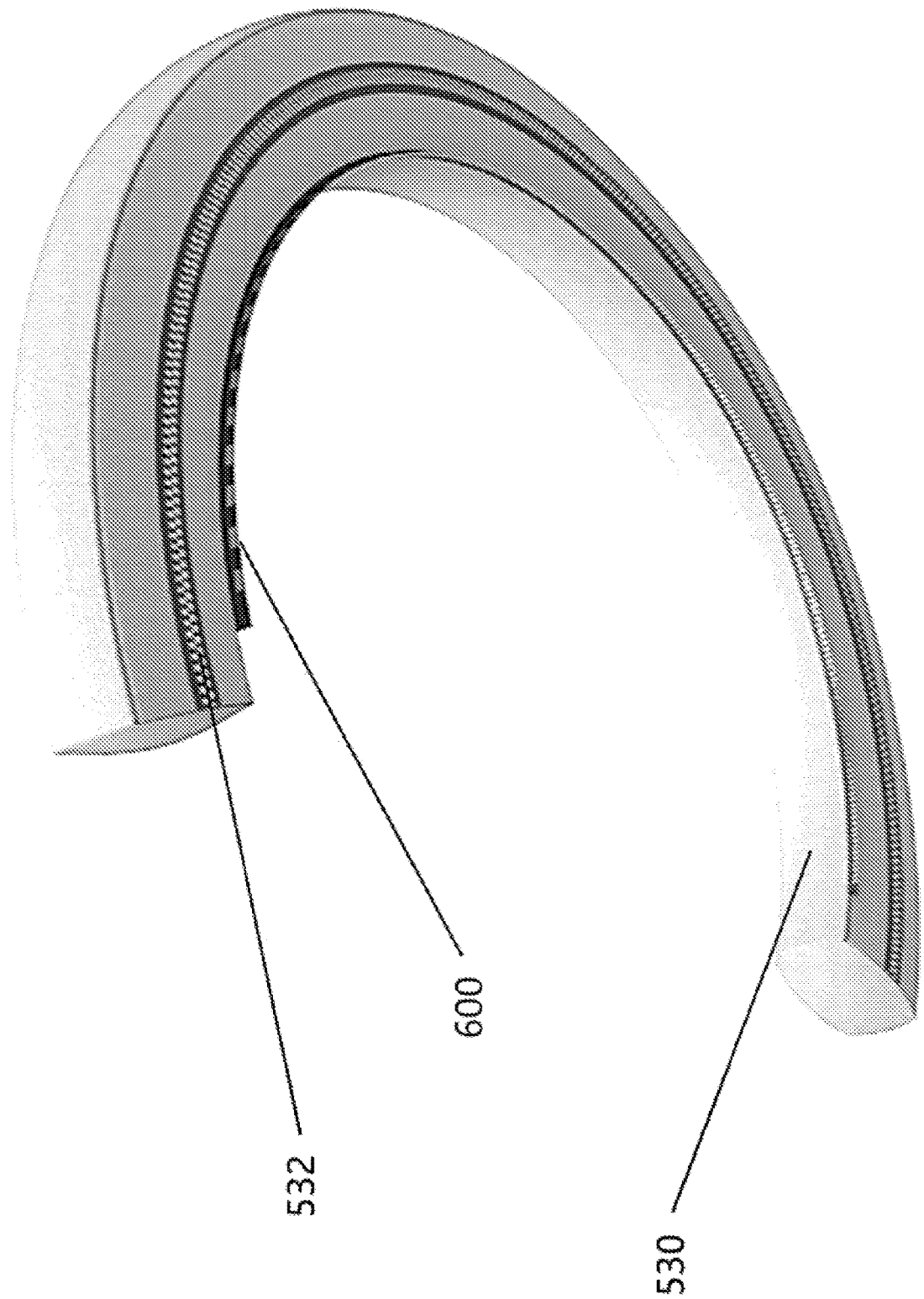

The pet bed 500 can optionally include a bolster 530 that can be the same or similar to bolster 432 of FIG. 11. The bolster 530 can be formed of the same or different materials from the peripheral support 510. The bolster 530 can be inflatable and/or filled with a compressible material (e.g., foam, compressible polyurethane etc.); however, this is not required. The bolster 530 is connected to a top portion of the peripheral support 510. The bolster 530 can be permanently connected or removably connected to the peripheral support 510. The type of connection between the bolster and peripheral support 510 is non-limiting (e.g., stitching, adhesive, melted seam, hook and loop fastener, zipper, snaps, clips, cord and loops, hooks, etc.). In one non-limiting configuration, when the bolster 530 is removably connected to the peripheral support 510, the connection can be formed by a zipper 600 as illustrated in FIGS. 13, 17-19. As illustrated in FIGS. 17-19, one part of the zipper can be located on the bolster 530 and the other part of the zipper can be located on the peripheral support 510. As illustrated in FIG. 13, the zipper can optionally be positioned on the bottom ends of the bolster 530; however, this is not required as illustrated in FIG. 17. At least a portion of the zipper is illustrated in FIG. 13 to be located on the bottom inner edge of the bolster 530. As illustrated in FIG. 18, a portion of the zipper is positioned on the peripheral support 510 and is spaced inwardly from the outer peripheral edge of the peripheral support 510 and located at or near the outer peripheral edge of the support material 520.

When the bolster 530 and peripheral support 510 are inflatable, the bolster 530 can be inflated simultaneously or separately from peripheral support 510.

The front ends of the bolster 530 can be configured to slope downwardly as illustrated in FIG. 13; however, this is not required as illustrated in FIG. 17.

As illustrated in FIG. 19, the bolster 530 can optionally include a zipper 532 that enables an inflatable tube, foam, or other compressible material to be inserted into and/or removed from the interior of the bolster.

The pet bed 500 can optionally include a cover pad 550 that is configured to at least partially overlie the outer surface of peripheral support 510 and optionally overlie the bolster 530 (when used). The cover pad 550 can be formed of any number of materials (e.g., fabric, plastic, vinyl, foam, etc.). In one non-limiting configuration, the cover pad is formed of a fabric material. The cover pad can be used to 1) provide a soft surface for the pet bed, 2) create an aesthetically pleasing pet bed, 3) provide protection to the peripheral support 510 from inadvertent damage or puncturing by a pet claw, 4) provide structural strength to the peripheral support 510, and/or 5) minimize deformation, damage, or bursting of the peripheral support 510.

The type of connection used to secure the cover pad 550 to is non-limiting (e.g., form fit, stitching, adhesive, melted seam, hook and loop fastener, zipper, snaps, clips, cord and loops, hooks, etc.). In one non-limiting configuration, the cover pad 550 is form fitted to the peripheral support 510 and is designed to be removably connected to the peripheral support 510. As illustrated in FIG. 12, the bottom surface of the cover pad 550 has a shape that is the same or similar to the top surface of the top portion of the peripheral support 510 and the optional bolster 530 when connected to the peripheral support 510.

In one non-limiting arrangement, the cover pad 550 is formed of 1) a porous material to allow liquids to pass through the cover pad, 2) a washable material, 3) a flexible material, 4) a stretchable material, 5) a fiber-reinforced material, and/or 6) a durable material.

It will thus be seen that the objects set forth above, among those made apparent from the preceding description, are efficiently attained, and since certain changes may be made in the constructions set forth without departing from the spirit and scope of the disclosure, it is intended that all matter contained in the above description and shown in the accompanying drawings shall be interpreted as illustrative and not in a limiting sense. The disclosure has been described with reference to preferred and alternate embodiments. Modifications and alterations will become apparent to those skilled in the art upon reading and understanding the detailed discussion of the disclosure provided herein. This disclosure is intended to include all such modifications and alterations insofar as they come within the scope of the present disclosure. It is also to be understood that the following claims are intended to cover all of the generic and specific features of the disclosure herein described and all statements of the scope of the disclosure, which, as a matter of language, might be said to fall therebetween.

What is claimed:

1. A pet bed comprising peripheral support and a support material is connected to said peripheral support, said peripheral support includes a central opening, said peripheral support has a cross-sectional area along a longitudinal axis of said peripheral support, said central opening constitutes about 10-90% of a cross-sectional area of said peripheral support, said support material configured to cover at least 60% of said central opening, said peripheral support including a top surface on an outer peripheral edge of said peripheral support, said support material is formed of a flexible and stretchable material so as to create a trampoline-type effect when a pet rests on said support material, said peripheral support at least partially inflatable, said peripheral support configured to compress to a second compressed state when a downward force is applied to said peripheral support, said peripheral support configured to decompress to its original uncompressed state when said downward force is removed from said peripheral support, all of said support material is positioned above the floor surface while said peripheral support is fully inflated and in said uncompressed state, said support material is positioned above the floor surface while said peripheral support is fully inflated and in said second compressed state, said support material is connected to a top portion of said peripheral support, said support material includes a recessed portion, a central portion of said recessed portion is positioned below said top surface of said outer peripheral edge of said support material while said peripheral support is fully inflated, said recessed portion including an opening to enable liquid to pass through said support material, wherein said support material has an outer peripheral edge that is connected to a top portion of said peripheral support, said support material does not fully overlie said top surface of said outer peripheral edge of said peripheral support when said support material is connected to said peripheral support.

2. The pet bed as defined in claim 1, wherein said peripheral support is a single inflatable tube, said single inflatable tube providing the only support for said support material above a ground surface when said single inflatable tube is inflated and a bottom surface of said single inflatable tube is placed on the ground surface.

3. The pet bed as defined in claim 1, wherein an outer surface of said peripheral support includes a fabric material that 1) provides structural support to said peripheral support to inhibit or prevent undue deformation or compression of said peripheral support when a pet lies on said pet bed, 2) inhibits or prevents bursting of said peripheral support, and/or 3) provides a soft surface upon which a pet can lie.

4. The pet bed as defined in claim 1, further including a bolster, said bolster is connected to a top portion of said peripheral support.

5. The pet bed as defined in claim 4, wherein said bolster is inflatable and/or is filled with a compressible material.

6. The pet bed as defined in claim 4, wherein said bolster is removably connected to said peripheral support by a zipper.

7. The pet bed as defined in claim 1, further including a cover pad, said cover pad is configured to overlie 60-100% of a top surface of said peripheral support, 60-100% of a top surface of said support material, and at least a portion of a side of said peripheral support, said cover pad releasably connected to said peripheral support.

8. The pet bed as defined in claim 7, wherein said cover pad is configured to 1) provide a soft surface for said pet bed, 2) create an aesthetically pleasing pet bed, 3) provide protection to said peripheral support from inadvertent damage or puncturing by a pet claw, 4) provide structural strength to said peripheral support, and/or 5) minimize deformation or damage or bursting of said peripheral support.

9. The pet bed as defined in claim 7, wherein said cover pad is form fitted to said peripheral support.

10. The pet bed as defined in claim 1, wherein said support material is connected to said peripheral support by one or more arrangements selected from the group consisting of stitching, adhesive, melted seam, hook and loop fastener, zipper, snaps, clips, cord and loops and hooks.

11. The pet bed as defined in claim 1, wherein a top surface of said support material is formed of a plurality of pieces of material that are connected together by one or more arrangements selected form the group consisting of stitching, melted seam and adhesive.

12. The pet bed as defined in claim 1, further including a cover pad; said cover pad is configured to overlie at least a portion of said support material and overlie at least a portion of a bottom surface of said peripheral support.

13. A pet bed comprising peripheral support, a support material, a bolster, and a cover pad; said peripheral support includes a central opening; said peripheral support has a cross-sectional area along a longitudinal axis of said peripheral support; said central opening constitutes about 10-90% of a cross-sectional area of said peripheral support; said peripheral support configured to decompress to its original uncompressed state when said downward force is removed from said peripheral support; said peripheral support is a single inflatable tube; said peripheral support includes a top surface on an outer peripheral edge of said peripheral support; said support material has an outer peripheral edge that is connected to a top portion of said peripheral support; said support material does not fully overlie said top surface of said outer peripheral edge of said peripheral support when said support material is connected to said peripheral support; said support material configured to cover at least 60% of said central opening; all of said support material positioned above a ground surface when said single inflatable tube is inflated and a bottom surface of said single inflatable tube positioned above a ground surface; said support material is formed of a flexible and stretchable material so as to create a trampoline-type effect when a pet rests on said support material; said support material includes a recessed portion; a central portion of said recessed portion is positioned below said top surface of said outer peripheral edge of said support material while said single inflatable tube is inflated; said recessed portion including an opening to enable liquid to pass through said support material; said bolster is positioned on or above said top surface of said peripheral support; said cover pad is configured to overlie said bolster and at least a portion of said support material.

14. The pet bed as defined in claim 13, wherein said bolster is spaced from said support material.

15. The pet bed as defined in claim 13, wherein said bolster is releasably connected to said top surface of said peripheral support.

16. The pet bed as defined in claim 13, wherein said support material is connected to said peripheral support by one or more arrangements selected from the group consisting of stitching, adhesive, melted seam, hook and loop fastener, zipper, snaps, clips, cord and loops and hooks.

17. The pet bed as defined in claim 13, wherein a top surface of said support material is formed of a plurality of pieces of material that are connected together by one or more arrangements selected form the group consisting of stitching, melted seam and adhesive.

* * * * *